US008678777B2

(12) United States Patent
Fulkerson et al.

(10) Patent No.: US 8,678,777 B2
(45) Date of Patent: Mar. 25, 2014

(54) DENSE PHASE PUMP FOR DRY PARTICULATE MATERIAL

(71) Applicant: Nordson Corporation, Westlake, OH (US)

(72) Inventors: Terrence M. Fulkerson, Brunswick Hills, OH (US); Edwin Jeroen Beuk, Hamont-Achel (BE); Ulf Kleineidam, Hamburg (DE); Andreas Kleineidam, Elmshorn (DE)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 13/680,316

(22) Filed: Nov. 19, 2012

(65) Prior Publication Data

US 2013/0078117 A1 Mar. 28, 2013

Related U.S. Application Data

(60) Continuation of application No. 12/963,969, filed on Dec. 9, 2010, now Pat. No. 8,333,570, which is a continuation of application No. 12/407,929, filed on Mar. 20, 2009, now Pat. No. 7,997,878, which is a division of application No. 10/711,429, filed on Sep. 17, 2004, now abandoned.

(60) Provisional application No. 60/524,459, filed on Nov. 24, 2003.

(51) Int. Cl.

| | |
|---|---|
| ***A01D 87/10*** | (2006.01) |
| ***F04B 23/14*** | (2006.01) |
| ***E21B 43/12*** | (2006.01) |
| ***B65G 53/58*** | (2006.01) |

(52) U.S. Cl.
USPC .................... 417/86; 417/65; 406/90; 406/98

(58) Field of Classification Search
USPC .................. 417/65, 86, 390, 559; 415/50, 90; 406/50, 90, 97, 98
See application file for complete search history.

(56) References Cited

U.S. PATENT DOCUMENTS 3,260,285 A 7/1966 Vogt
3,552,712 A 1/1971 Whitlock
(Continued)

FOREIGN PATENT DOCUMENTS

DE 1 087 520 8/1960
DE 4300832 7/1994
(Continued)

OTHER PUBLICATIONS

Office Action for Japanese Patent Application No. 2006-541591 dated Oct. 27, 2010. See p. 2, Regarding Reason 3.

(Continued)

*Primary Examiner* — Peter J Bertheaud
(74) *Attorney, Agent, or Firm* — Calfee, Halter & Griswold LLP

(57) ABSTRACT

A dense phase pump for particulate material includes a pump chamber wherein material flows into the pump chamber under negative pressure and flows out of the pump chamber under positive pressure. A plurality of pinch valves are provided to control flow of material into and out of the pump chamber. The pinch valves are operated independent of each other and of the pump cycle rate. A modular design of the pump is provided.

8 Claims, 20 Drawing Sheets

(56) References Cited

U.S. PATENT DOCUMENTS

| | | | | |
|---|---|---|---|---|
| 3,951,572 | A | 4/1976 | Ray, Jr. et al. | |
| 4,116,589 | A | 9/1978 | Rishton | |
| 4,250,872 | A * | 2/1981 | Tamari | 600/16 |
| 4,268,005 | A * | 5/1981 | Raftis et al. | 251/5 |
| 4,552,552 | A * | 11/1985 | Polaschegg et al. | 604/6.05 |
| 5,273,406 | A * | 12/1993 | Feygin | 417/474 |
| 6,102,361 | A | 8/2000 | Riikonen | |
| 6,227,768 | B1 * | 5/2001 | Higuchi et al. | 406/89 |
| 6,325,572 | B1 | 12/2001 | Dietrich | |
| 6,508,610 | B2 | 1/2003 | Dietrich | |
| 6,722,822 | B2 | 4/2004 | Pfeiffer et al. | |
| 6,908,048 | B2 | 6/2005 | Di Gioia et al. | |
| 6,959,843 | B2 | 11/2005 | Kondo | |
| 7,150,585 | B2 | 12/2006 | Kleineidam et al. | |
| 7,163,359 | B2 * | 1/2007 | Moser | 406/74 |
| 2002/0079330 | A1 | 6/2002 | Kondo | |

FOREIGN PATENT DOCUMENTS

| | | | |
|---|---|---|---|
| DE | 19736703 | 3/1999 | |
| EP | 1 689 531 | 6/2009 | |
| JP | 57-11948 | 3/1982 | |
| JP | 61-090917 | 9/1986 | |
| JP | 08-073034 | 3/1996 | |
| JP | 9-71325 | 3/1997 | |
| JP | 09-236246 | 9/1997 | |
| JP | 10-024255 | 1/1998 | |
| JP | 2003-275855 | 9/2003 | |
| WO | 03/024612 | 3/2003 | |
| WO | WO 03/024612 | * 3/2003 | B05B 7/14 |
| WO | 2003/083335 | 10/2003 | |
| WO | 2004/087331 | 10/2004 | |
| WO | 2005/005060 | 1/2005 | |

OTHER PUBLICATIONS

International Search Report dated May 3, 2005, for International Application No. PCT/US2004/039078.

Written Opinion dated May 3, 2005, for International Application No. PCT/US2004/039078.

Communication dated Sep. 23, 2009, for European Patent Application No. 09161262.2.

* cited by examiner

DENSE PHASE PUMP FOR DRY PARTICULATE MATERIAL

RELATED APPLICATIONS

This application is a continuation of U.S. Non-Provisional patent application Ser. No. 12/963,969 filed on Dec. 9, 2010, for DENSE PHASE PUMP FOR DRY PARTICULATE MATERIAL, which is a continuation of U.S. Non-Provisional patent application Ser. No. 12/407,929 filed on Mar. 20, 2009, for DENSE PHASE PUMP WITH SINGLE ENDED FLOW AND PURGE, now U.S. Pat. No. 7,997,878, which is a divisional of U.S. Non-Provisional patent application Ser. No. 10/711,429 filed on Sep. 17, 2004, for DENSE PHASE PUMP FOR DRY PARTICULATE MATERIAL, now abandoned, which claims the benefit of U.S. Provisional Patent Application Ser. No. 60/524,459 filed on Nov. 24, 2003, for PINCH PUMP WITH VACUUM TUBE, now expired, the entire disclosures of which are fully incorporated herein by reference.

TECHNICAL FIELD OF THE INVENTION

The invention relates generally to material application systems, for example but not limited to powder coating material application systems. More particularly, the invention relates to a pump that reduces cleaning time, color change time and improves convenience of use.

BACKGROUND OF THE INVENTION

Material application systems are used to apply one or more materials in one or more layers to an object. General examples are powder coating systems, other particulate material application systems such as may be used in the food processing and chemical industries. These are but a few examples of a wide and numerous variety of systems used to apply particulate materials to an object.

The application of dry particulate material is especially challenging on a number of different levels. An example, but by no means a limitation on the use and application of the present invention, is the application of powder coating material to objects using a powder spray gun. Because sprayed powder tends to expand into a cloud or diffused spray pattern, known powder application systems use a spray booth for containment. Powder particles that do not adhere to the target object are generally referred to as powder overspray, and these particles tend to fall randomly within the booth and will alight on almost any exposed surface within the spray booth. Therefore, cleaning time and color change times are strongly related to the amount of surface area that is exposed to powder overspray.

In addition to surface areas exposed to powder overspray, color change times and cleaning are strongly related to the amount of interior surface area exposed to the flow of powder during an application process. Examples of such interior surface areas include all surface areas that form the powder flow path, from a supply of the powder all the way through the powder spray gun. The powder flow path typically includes a pump that is used to transfer powder from a powder supply to one or more spray guns. Hoses are commonly used to connect the pumps to the guns and the supply.

Interior surface areas of the powder flow path are typically cleaned by blowing a purge gas such as pressurized air through the powder flow path. Wear items that have surfaces exposed to material impact, for example a spray nozzle in a typical powder spray gun, can be difficult to clean due to impact fusion of the powder on the wear surfaces. Pumps also tend to have one or more wear surfaces that are difficult to clean by purging due to impact fusion. Conventional venturi pumps can be purged in the direction of the gun, but are difficult to reverse purge back to the supply.

There are two generally known types of dry particulate material transfer processes, referred to herein as dilute phase and dense phase. Dilute phase systems utilize a substantial quantity of air to push material through one or more hoses or other conduit from a supply to a spray applicator. A common pump design used in powder coating systems is a venturi pump which introduces a large volume of air under pressure and higher velocity into the powder flow. In order to achieve adequate powder flow rates (in pounds per minute or pounds per hour for example), the components that make up the flow path must be large enough to accommodate the flow with such high air to material (in other words lean flow) otherwise significant back pressure and other deleterious effects can occur.

Dense phase systems on the other hand are characterized by a high material to air ratio (in other words a "rich" flow). A dense phase pump is described in pending U.S. patent application Ser. No. 10/501,693 filed on Jul. 16, 2004 for PROCESS AND EQUIPMENT FOR THE CONVEYANCE OF POWDERED MATERIAL, the entire disclosure of which is fully incorporated herein by reference, and which is owned by the assignee of the present invention. This pump is characterized in general by a pump chamber that is partially defined by a gas permeable member. Material, such as powder coating material as an example, is drawn into the chamber at one end by gravity and/or negative pressure and is pushed out of the chamber through an opposite end by positive air pressure. This pump design is very effective for transferring material, in part due to the novel arrangement of a gas permeable member forming part of the pump chamber. The overall pump, however, in some cases may be less than optimal for purging, cleaning, color change, maintenance and material flow rate control.

Many known material application systems utilize electrostatic charging of the particulate material to improve transfer efficiency. One form of electrostatic charging commonly used with powder coating material is corona charging that involves producing an ionized electric field through which the powder passes. The electrostatic field is produced by a high voltage source connected to a charging electrode that is installed in the electrostatic spray gun. Typically these electrodes are disposed directly within the powder path, adding to the complication of purging the powder path.

SUMMARY OF THE INVENTION

The invention provides apparatus and methods for improving the cleanability and serviceability of a pump for particulate material, such as, for example but not by way of limitation, powder coating material. The invention also contemplates apparatus and methods for improving material flow rate control using a dense phase pump. The invention further contemplates methods and apparatus for dense phase transfer with a pump concept that can be reverse or upstream purged to the source as well as forward or downstream purged to an applicator. In accordance with another aspect of the invention, method and apparatus for a dense phase pump are contemplated that provide more than one purge function, such as for example, a soft purge and a hard purge, both optionally applied in a forward or reverse purge direction.

Cleanability of the pump refers to reducing the quantity of material that needs to be purged or otherwise removed from interior surfaces that define the material flow path through the pump, as well as simplifying the purging process by making the material flow path more amenable to purge cleaning. Improving cleanability results in faster color change times, for example, by reducing contamination risk and shortening the amount of time needed to remove a first color powder from the pump prior to introducing a second color powder.

In accordance with another aspect of the invention, interior surface areas are reduced so as to reduce the amount of surface area exposed to the flow of material. In one embodiment, the reduced surface areas result from the use of a pump that transfers or moves material in dense phase.

In accordance with another aspect of the invention, a dense phase pump is contemplated that is easier to purge by providing a material flow path that has minimal dead space and straight through purging. In one embodiment, a pump chamber is provided that is generally cylindrical with a first open end through which material enters and exits the pump chamber, and a second open end through which purge air can be introduced to purge the pump chamber along the entire length thereof. In a specific embodiment the purge air is introduced at the second end of the cylindrical pump chamber axially opposite the first end. This provides straight through purging of the pump chambers. This arrangement also facilitates the ability to forward purge through to the spray applicator and also to reverse purge the pump, even back to the supply.

In accordance with another aspect of the invention, cleanability and serviceability are facilitated by providing replaceable wear parts that have interior surfaces that form part of the material flow path in the pump. On one embodiment, the wear parts are realized in the form of Y-blocks that are releasably retained in a solid body for easy access and replacement.

In accordance with a further aspect of the invention, cleanability and serviceability are further enhanced by a modular pump design. In one embodiment, a modular dense phase pump is provided that is characterized by a number of modular elements such as a manifold body, a valve body and one or more material flow path bodies that include one or more wear surfaces. The modular elements are secured together such as by bolts. By locating the wear parts in separate modular elements, they can be easily replaced or serviced when normal purging alone is not sufficient to clean the surfaces. In accordance with another aspect of the invention, a modular construction is contemplated by which all pneumatic energy is supplied to the pump via a manifold body. In one embodiment, the manifold body provides pneumatic ports on a single surface to receive pressurized air from corresponding ports formed in a single surface of a supply manifold. The manifold body also optionally accommodates a purge function. In accordance with still another aspect of the invention, pressurized air needed for pneumatic valves in the pump is routed internally to the valve body from the manifold body.

In further accordance with another aspect of the invention, interior surface areas are reduced by designing the pump to operate with high material density low air volume material feed. In the context of a powder coating material pump, high density means that the powder supplied by the pump to an applicator has a substantially reduced amount of entrainment or flow air in the powder flow as compared to conventional low density or dilute powder flow systems. Low air volume simply refers to the use of less volume of flow air needed to move or transfer powder due to its higher density in the powder flow.

By removing a substantial amount of the air in the powder flow, the associated conduits, such as the powder path through the pump, a powder feed hose and a powder feed tube, can be substantially reduced in diameter, thereby substantially reducing the interior surface areas.

In accordance with another aspect of the invention, a dense phase pump is provided that provides improved control and selection of the material flow rate from the pump by providing a scalable flow pump arrangement. In one embodiment, the pump includes a pump chamber that is at least partially defined by a gas permeable member. The gas permeable member is disposed in a pneumatic pressure chamber of the pump so that material flows into and out of the pump chamber in response to the application of negative and positive pressure applied to the pressure chamber. Flow of material into and out of the pump chamber is controlled by operation of two or more pinch valves. Material flow rate control is provided, in accordance with one aspect of the invention, by providing separate and independent control of each of the pinch valves with respect to each other. Optionally, control of the pinch valves can be independent of the pump cycle rate which refers to the cycle time for applying positive and negative pressure to the pump chamber. In one embodiment, the pinch valves are realized in the form of flexible members that are open and closed by pneumatic pressure applied to an outside surface of the flexible member. This avoids the need for a control member such as a piston, rod or other device to open and close the pinch valves, and also facilitates independent timing of the pinch valve operation. The use of air pressure to open and close the flexible members greatly simplifies the overall pump design and further facilitates use of the modular embodiment when needed.

In an alternative embodiment of a scalable material flow rate control process, flow rate control is effected independent of the pump cycle rate by controlling the suction time portion of the pump cycle rate. This allows for control of the flow rate with or without independent control of the suction and delivery pinch valves. In accordance with another aspect of the invention, flow rate control by use of the suction time, in combination with control of the pinch valves, allows the suction time to be adjusted so as to occur during the middle of the pump cycle to prevent overlap between the suction and delivery valve on times, thereby reducing the amount of pressurized air needed to operate the pump.

In accordance with another aspect of the invention, the above described arrangement of a single pump chamber and two pinch valves can be optionally modified to include a second pump chamber and two additional pinch valves. The second pump chamber operates out of phase with the first pump chamber to provide a smooth delivery of material from the pump. In one embodiment, the one pump chamber fills with material while the other empties and vice-versa in an alternating manner. Material flow rate control and consistency of flow can be optimized by providing independent timing of each of the four pinch valves with respect to each other and/or with respect to the cycle time of the pump. Such flow control can be useful, for example, with a pump that supplies material to a spray applicator. In another embodiment, the invention contemplates a transfer pump that is used to move powder from a powder recovery system back to a supply. In a transfer pump embodiment, consistency of flow is not usually of concern because the material is simply being transferred to a receptacle. Volume of flow is typically of primary interest, therefore, independent timing control of all the pinch valves is not necessary.

These and other aspects and advantages of the present invention will be apparent to those skilled in the art from the following description of the exemplary embodiments in view of the accompanying drawings.

DETAILED DESCRIPTION OF THE INVENTION AND EXEMPLARY EMBODIMENTS THEREOF

Figure 1:
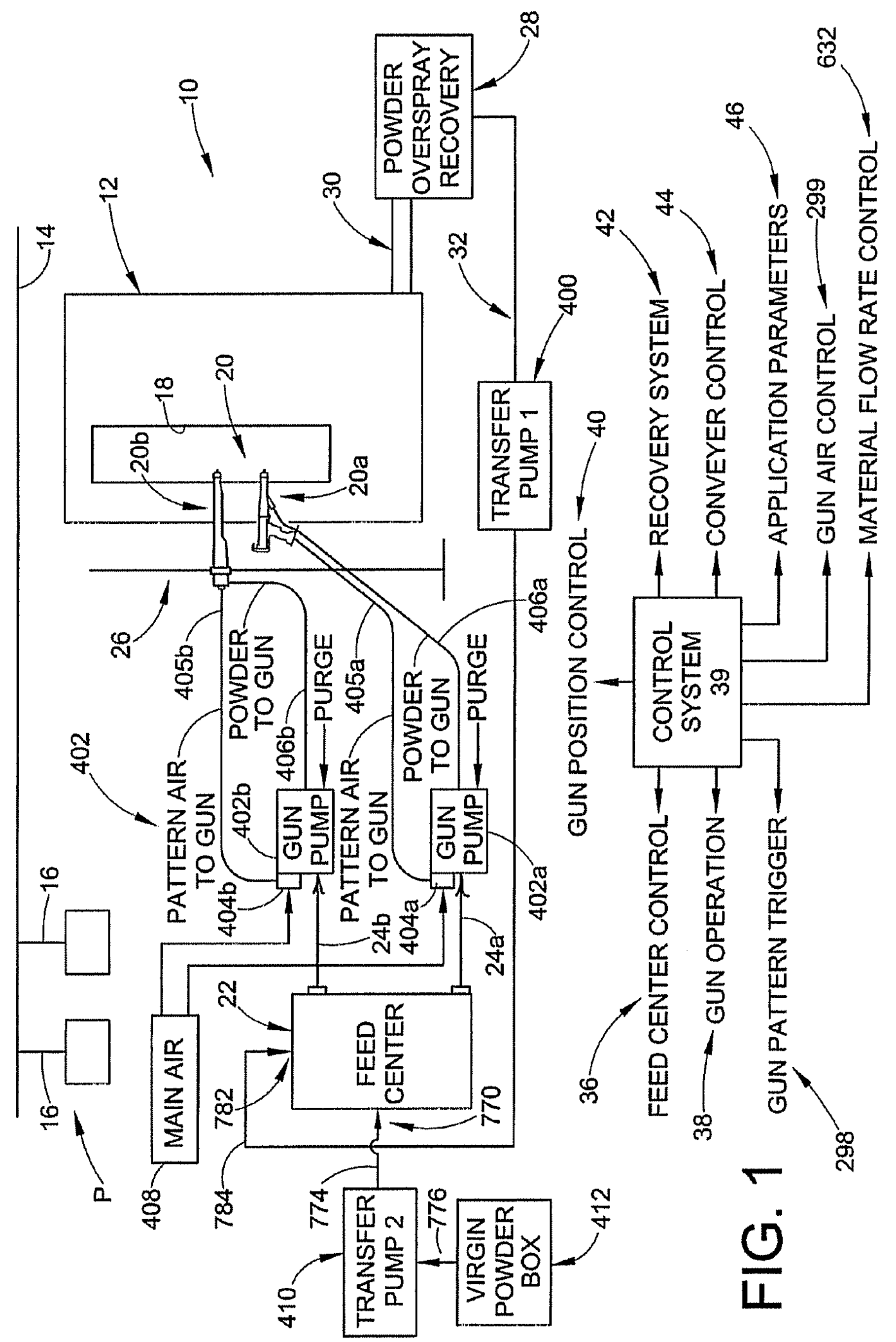
FIG. 1 is a simplified schematic diagram of a powder coating material application system utilizing the present invention.

The invention contemplates a number of new aspects for a dense phase pump for particulate material. The pump may be used in combination with any number or type of spray applicator devices or spray guns and material supply.

By "dense phase" is meant that the air present in the particulate flow is about the same as the amount of air used to fluidize the material at the supply such as a feed hopper. As used herein, "dense phase" and "high density" are used to convey the same idea of a low air volume mode of material flow in a pneumatic conveying system where not all of the material particles are carried in suspension. In such a dense phase system, the material is forced along a flow path by significantly less air volume as compared to a conventional dilute phase system, with the material flowing more in the nature of plugs that push each other along the passage, somewhat analogous to pushing the plugs as a piston through the passage. With smaller cross-sectional passages this movement can be effected under lower pressures.

In contrast, conventional flow systems tend to use a dilute phase which is a mode of material flow in a pneumatic conveying system where all the particles are carried in suspension. Conventional flow systems introduce a significant quantity of air into the flow stream in order to pump the material from a supply and push it through under positive pressure to the spray application devices. For example, most conventional powder coating spray systems utilize venturi pumps to draw fluidized powder from a supply into the pump. A venturi pump by design adds a significant amount of air to the powder stream. Typically, flow air and atomizing air are added to the powder to push the powder under positive pressure through a feed hose and an applicator device. Thus, in a conventional powder coating spray system, the powder is entrained in a high velocity high volume flow of air, thus necessitating large diameter powder passageways in order to attain usable powder flow rates.

Dense phase flow is oftentimes used in connection with the transfer of material to a closed vessel under high pressure. The present invention, in being directed to material application rather than simply transport or transfer of material, contemplates flow at substantially lower pressure and flow rates as compared to dense phase transfer under high pressure to a closed vessel. However, the invention also contemplates a dense phase transfer pump embodiment which can be used to transfer material to an open or closed vessel.

As compared to conventional dilute phase systems having air volume flow rates of about 3 to about 6 cfm (such as with a venturi pump arrangement, for example), the present invention may operate at about 0.8 to about 1.6 cfm, for example. Thus, in the present invention, powder delivery rates may be on the order of about 150 to about 300 grams per minute. These values are intended to be exemplary and not limiting. Pumps in accordance with the present invention can be designed to operate at lower or higher air flow and material delivery values.

Dense phase versus dilute phase flow can also be thought of as rich versus lean concentration of material in the air stream, such that the ratio of material to air is much higher in a dense phase system. In other words, in a dense phase system the same amount of material per unit time is transiting a flow path cross-section (of a tube for example) of lesser area as compared to a dilute phase flow. For example, in some embodiments of the present invention, the cross-sectional area of a powder feed tube is about one-fourth the area of a feed tube for a conventional venturi type system. For comparable flow of material per unit time then, the material is about four times denser in the air stream as compared to conventional dilute phase systems.

With reference to FIG. 1, in an exemplary embodiment, the present invention is illustrated being used with a material application system, such as, for example, a typical powder coating spray system 10. Such an arrangement commonly includes a powder spray booth 12 in which an object or part P is to be sprayed with a powder coating material. The application of powder to the part P is generally referred to herein as a powder spray, coating or application operation procedure or process, however, there may be any number of control functions, steps and parameters that are controlled and executed before, during and after powder is actually applied to the part.

As is known, the part P is suspended from an overhead conveyor 14 using hangers 16 or any other conveniently suitable arrangements. The booth 12 includes one or more openings 18 through which one or more spray applicators 20 may be used to apply coating material to the part P as it travels through the booth 12. The applicators 20 may be of any number depending on the particular design of the overall system 10. Each applicator can be a manually operated device as with device 20*a*, or a system controlled device, referred to herein as an automatic applicator 20*b*, wherein the term "automatic" simply refers to the fact that an automatic applicator is mounted on a support and is triggered on and off by a control system, rather than being manually supported and manually triggered. The present invention is directed to manual and automatic spray applicators.

It is common in the powder coating material application industry to refer to the powder applicators as powder spray guns, and with respect to the exemplary embodiments herein we will use the terms applicator and gun interchangeably. However, it is intended that the invention is applicable to material application devices other than powder spray guns, and hence the more general term applicator is used to convey the idea that the invention can be used in many particulate material application systems other than the exemplary powder coating material application system described herein. Some aspects of the invention are likewise applicable to electrostatic spray guns as well as non-electrostatic spray guns. The invention is also not limited by functionality associated with the word "spray". Although the invention is especially suited to powder spray application, the pump concepts and methods disclosed herein may find use with other material application techniques beyond just spraying, whether such techniques are referred to as dispensing, discharge, application or other terminology that might be used to describe a particular type of material application device.

The spray guns 20 receive powder from a supply or feed center such as a hopper 22 or other material supply through an associated powder feed or supply hose 24. The automatic guns 20*b* typically are mounted on a support 26. The support 26 may be a simple stationary structure, or may be a movable structure, such as an oscillator that can move the guns up and down during a spraying operation, or a gun mover or reciprocator that can move the guns in and out of the spray booth, or a combination thereof.

The spray booth 12 is designed to contain powder overspray within the booth, usually by a large flow of containment air into the booth. This air flow into the booth is usually effected by a powder overspray reclamation or recovery system 28. The recovery system 28 pulls air with entrained powder overspray from the booth, such as for example through a duct 30. In some systems the powder overspray is returned to the feed center 22 as represented by the return line 32. In other systems the powder overspray is either dumped or otherwise reclaimed in a separate receptacle.

In the exemplary embodiment herein, powder is transferred from the recovery system 28 back to the feed center 22 by a first transfer pump 400, an exemplary embodiment of which in accordance with the invention is described hereinafter. A respective gun pump 402 is used to supply powder from the feed center 22 to an associated spray applicator or gun 20. For example, a first gun pump 402*a* is used to provide dense phase powder flow to the manual gun 20*a* and a second gun pump 402*b* is used to provide dense phase powder flow to the automatic gun 20*b*. Exemplary embodiments of the gun pumps 402 in accordance with the invention are described hereinafter.

Each gun pump 402 operates from pressurized gas such as ordinary air supplied to the gun by a pneumatic supply manifold 404. The present invention provides a pump and manifold arrangement by which the pump 402 is mounted to the supply manifold 404 with a gasket or other seal device therebetween. This eliminates unnecessary plumbing between the manifold 404 and the pump 402. Although schematically illustrated in FIG. 1 as being directly joined, it is contemplated that in practice the manifolds 404 will be disposed in a cabinet or other enclosure and mounted to the pumps 402 with a wall of the cabinet therebetween. In this manner, the manifolds 404, which may include electrical power such as solenoid valves, are isolated from the spraying environment.

The supply manifold 404 supplies pressurized air to its associated pump 402 for purposes that will be explained hereinafter. In addition, each supply manifold 404 includes a pressurized pattern air supply that is provided to the spray guns 20 via air hoses or lines 405. Main air 408 is provided to the supply manifold 404 from any convenient source within the manufacturing facility of the end user of the system 10. Each pump 402 supplies powder to its respective applicator 20 via a powder supply hose 406.

In the FIG. 1 embodiment, a second transfer pump 410 is used to transfer powder from a supply 412 of virgin powder (that is to say, unused) to the feed center 22. Those skilled in the art will understand that the number of required transfer pumps 410 and gun pumps 402 will be determined by the requirements of the overall system 10 as well as the spraying operations to be performed using the system 10.

Although the gun pump and the transfer pumps may be the same design, in the exemplary embodiments there are differences that will be described hereinafter. Those differences take into account that the gun pump preferably provides a smooth consistent flow of powder material to the spray applicators 20 in order to provide the best coating onto the objects P, whereas the transfer pumps 400 and 410 are simply used to move powder from one receptacle to another at a high enough flow rate and volume to keep up with the powder demand from the applicators and as optionally supplemented by the powder overspray collected by the recovery system 28.

Other than the pumps 400, 410 and 402, the selected design and operation of the material application system 10, including the spray booth 12, the conveyor 14, the guns 20, the recovery system 28, and the feed center or supply 22, form no necessary part of the present invention and may be selected based on the requirements of a particular coating application. A particular spray applicator, however, that is well suited for use with the present invention is described in pending International patent application number PCT/US04/26887 for SPRAY APPLICATOR FOR PARTICULATE MATERIAL, filed on Aug. 18, 2004, the entire disclosure of which is incorporated herein by reference. However, many other applicator designs may be used as required for a particular application. A control system 34 likewise may be a conventional control system such as a programmable processor based system or other suitable control circuit. The control system 34 executes a wide variety of control functions and algorithms, typically through the use of programmable logic and program routines, which are generally indicated in FIG. 1 as including but not necessarily limited to feed center control 36 (for example supply controls and pump operation controls), gun operation control 38 (such as for example, gun trigger controls), gun position control 40 (such as for example control functions for the reciprocator/gun mover 26 when used), powder recovery system control 42 (for example, control functions for cyclone separators, after filter blowers and so on), conveyor control 44 and material application parameter controls 46 (such as for example, powder flow rates, applied film thickness, electrostatic or non-electrostatic application and so on). Conventional control system theory, design and programming may be utilized.

While the described embodiments herein are presented in the context of a dense phase pump for use in a powder coating material application system, those skilled in the art will readily appreciate that the present invention may be used in many different dry particulate material application systems, including but not limited in any manner to: talc on tires, super-absorbents such as for diapers, food related material such as flour, sugar, salt and so on, desiccants, release agents, and pharmaceuticals. These examples are intended to illustrate the broad application of the invention for dense phase application of particulate material to objects. The specific design and operation of the material application system selected provides no limitation on the present invention except as otherwise expressly noted herein.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Even from the general schematic illustration of FIG. 1 it can be appreciated that such complex systems can be very difficult and time consuming to clean and to provide for color change. Typical powder coating material is a very fine particulate and tends to be applied in a fine cloud or spray pattern directed at the objects being sprayed. Even with the use of electrostatic technology, a significant amount of powder overspray is inevitable. Cross contamination during color change is a significant issue in many industries, therefore it is important that the material application system be able to be thoroughly cleaned between color changes. Color changes however necessitate taking the material application system offline and thus is a significant cost driver. The present invention is directed to providing a pump that is easier and faster to clean. Additional features and aspects of the invention are applicable separately from the concern for cleanability.

Figure 2A:
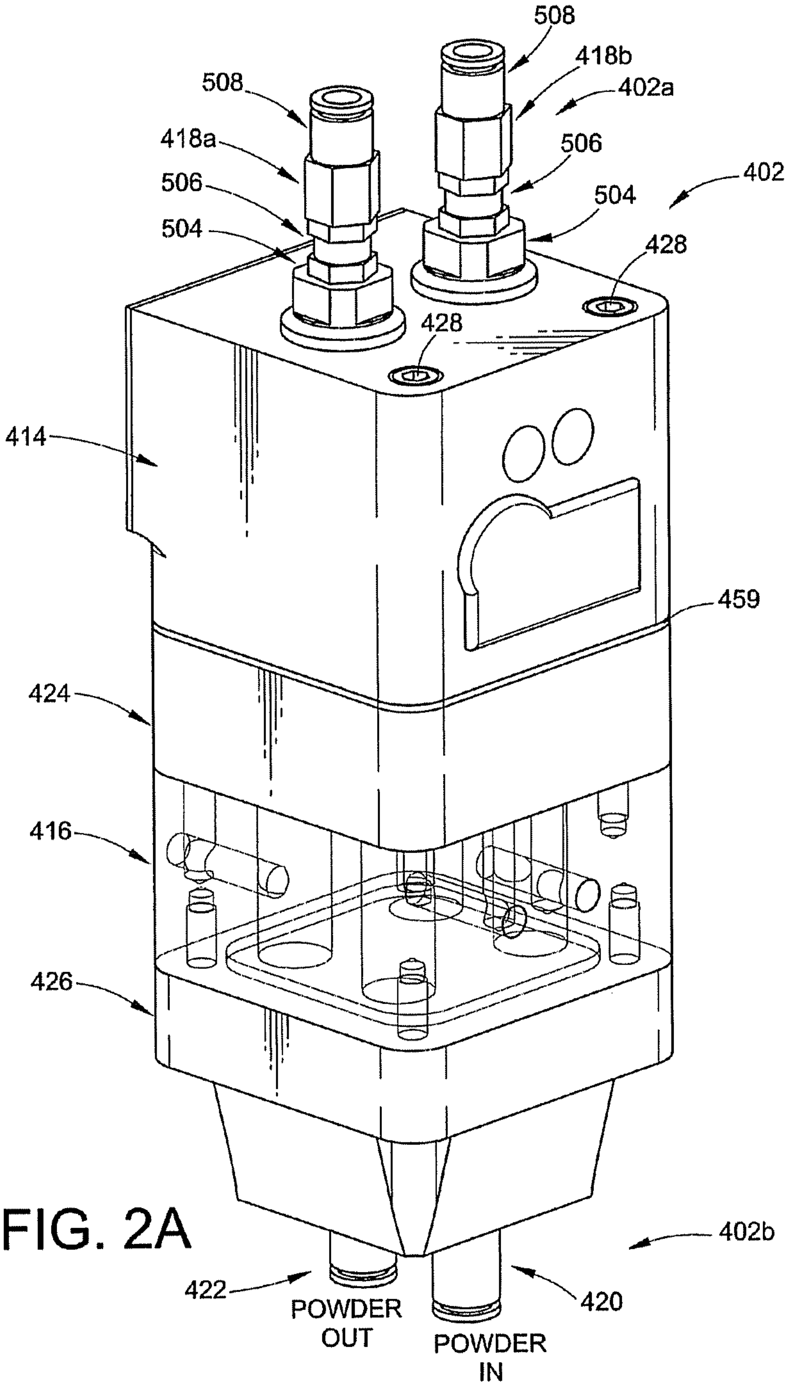
FIGS. 2A-2C are assembled and exploded isometric views of a pump in accordance with the invention.
Figure 2B:
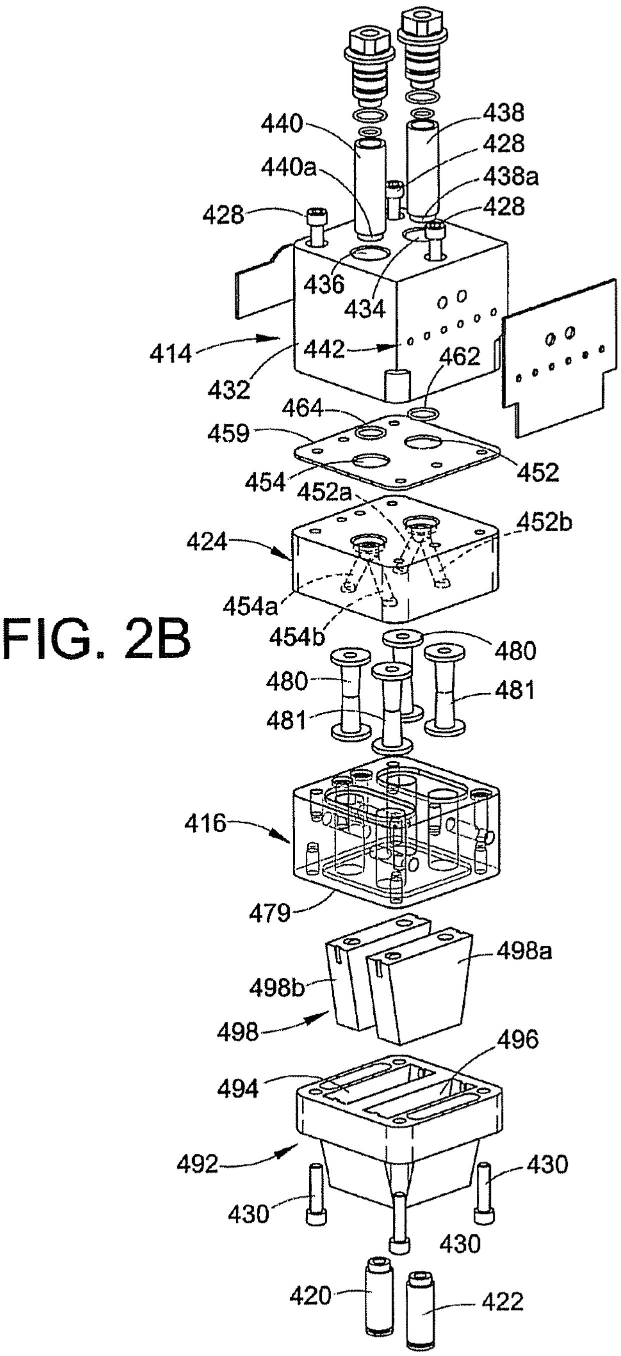
Figure 2C:
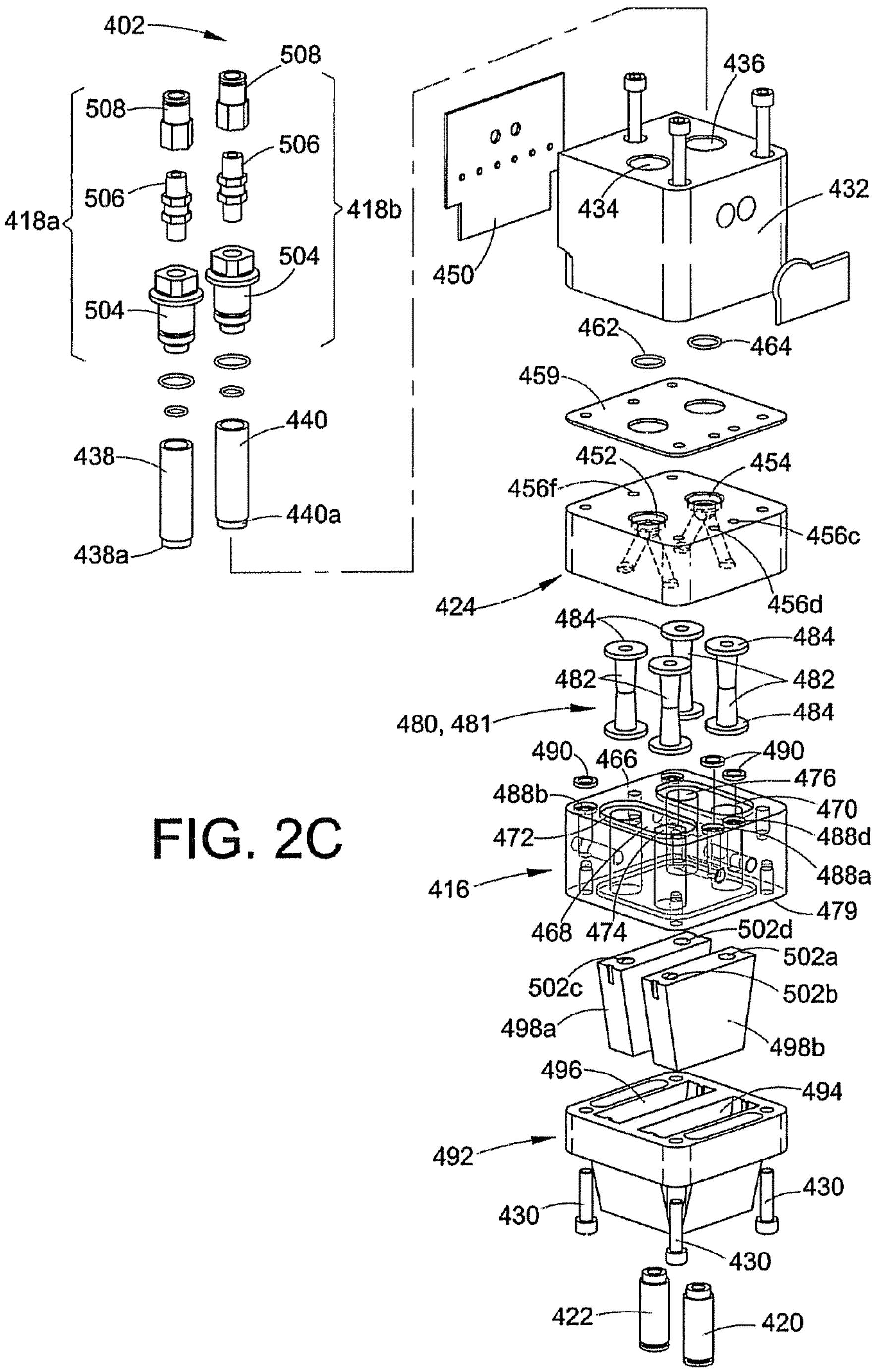
Figure 2D:
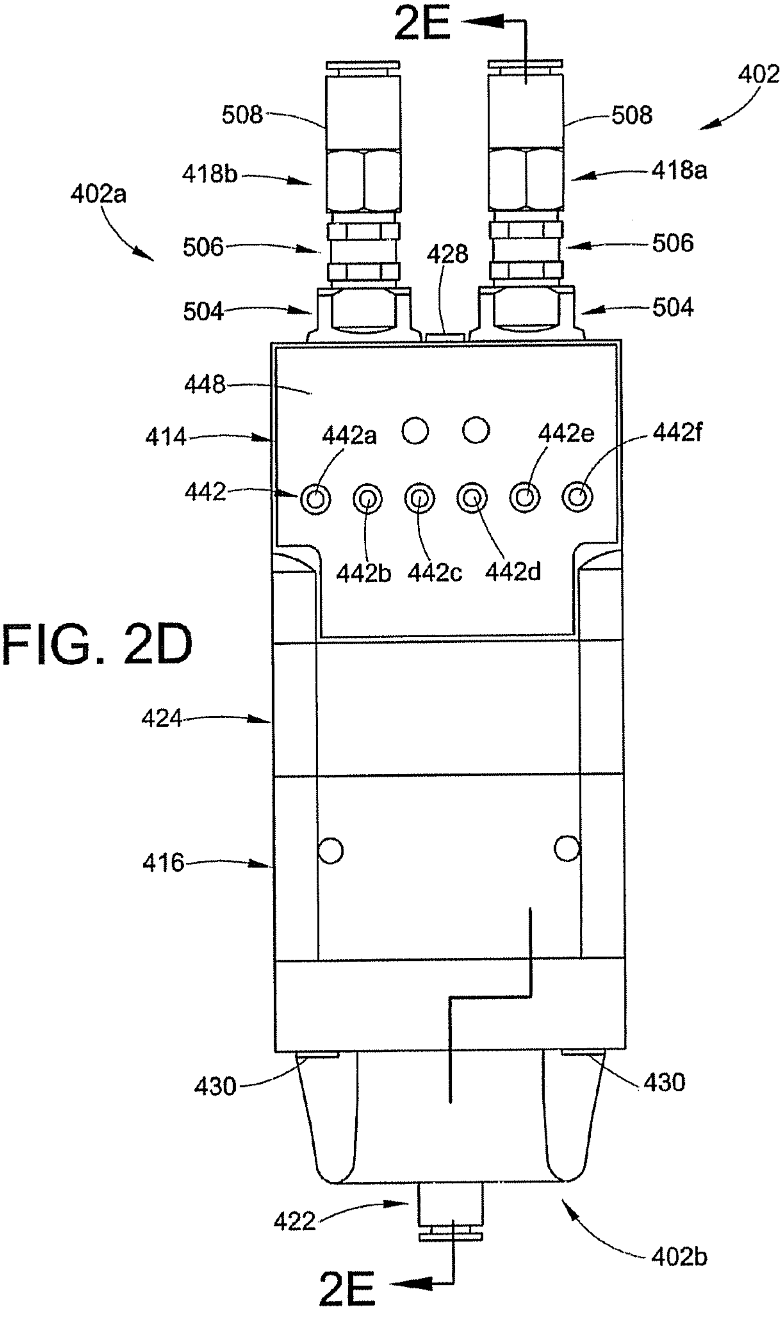
FIGS. 2D-2G are elevation and cross-sectional views of the assembled pump of FIG. 2A.
Figure 2E:
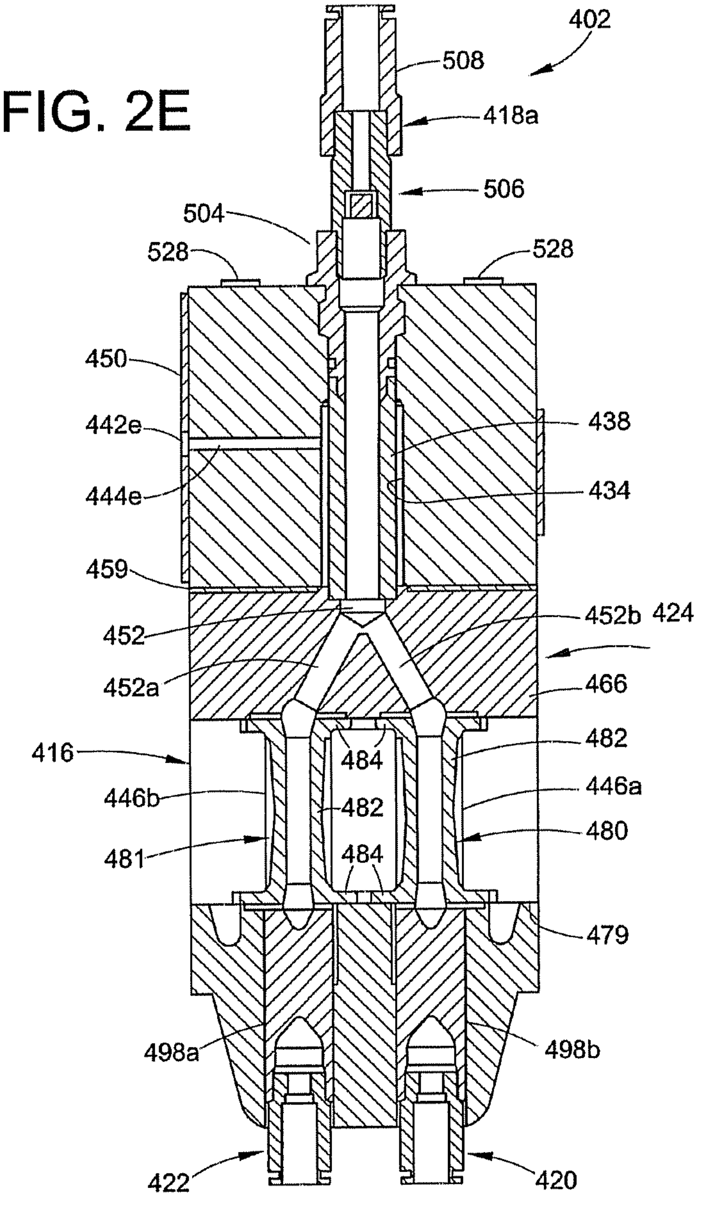
Figure 2F:
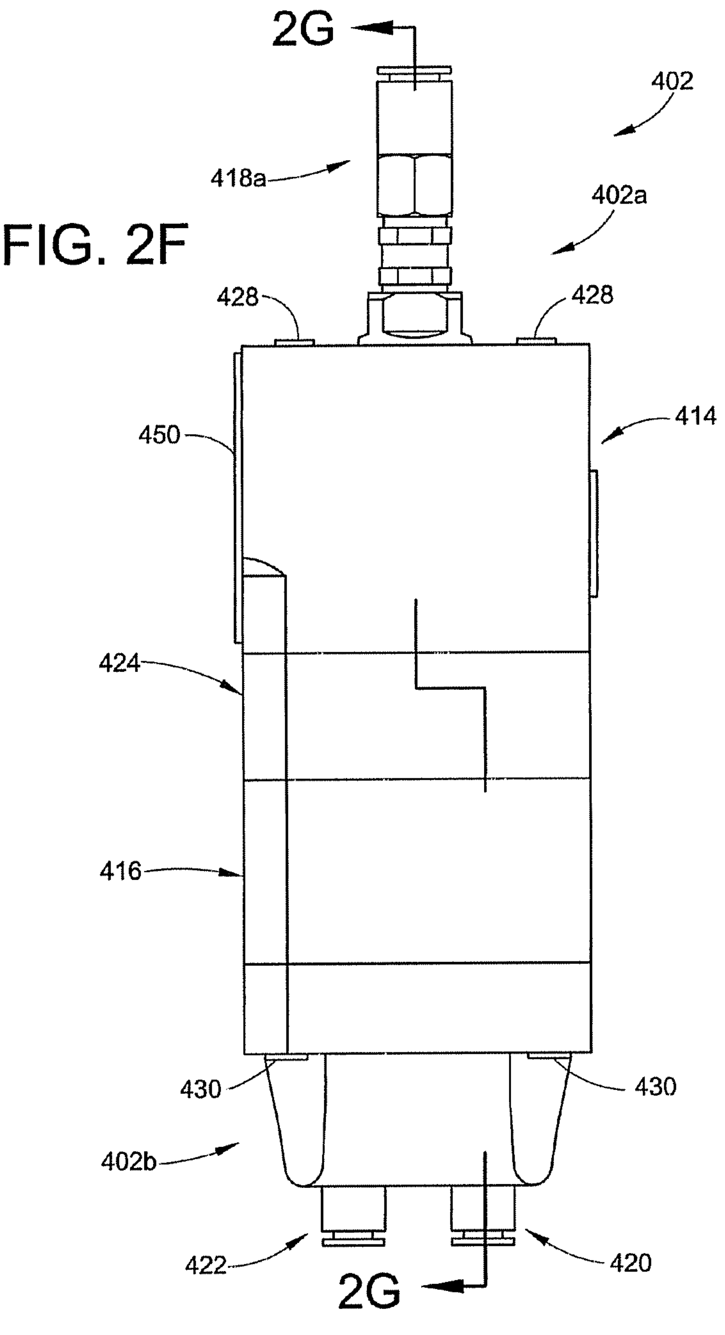
Figure 2G:
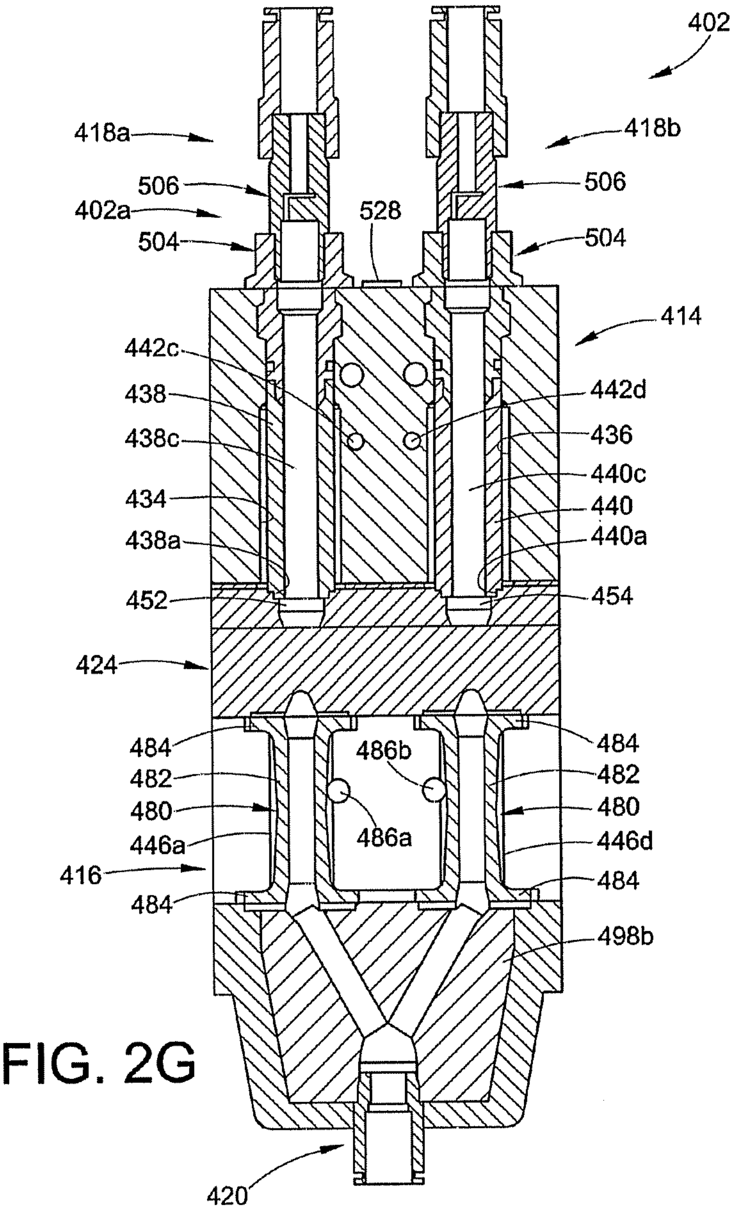
Figure 3A:
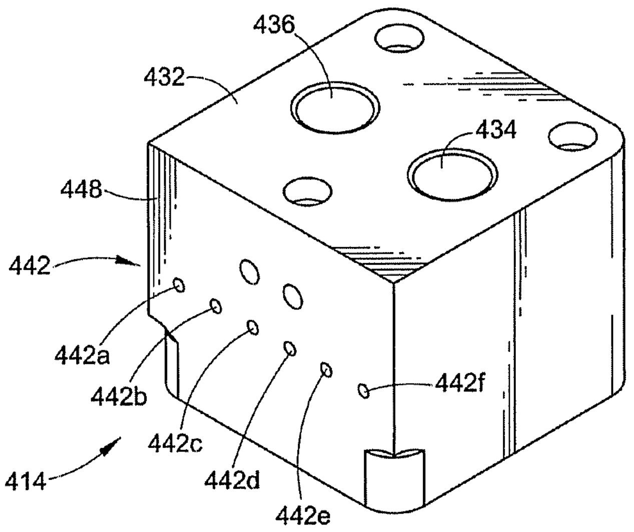
FIGS. 3A and 3B are an isometric and upper plan view of a pump manifold.
Figure 3B:
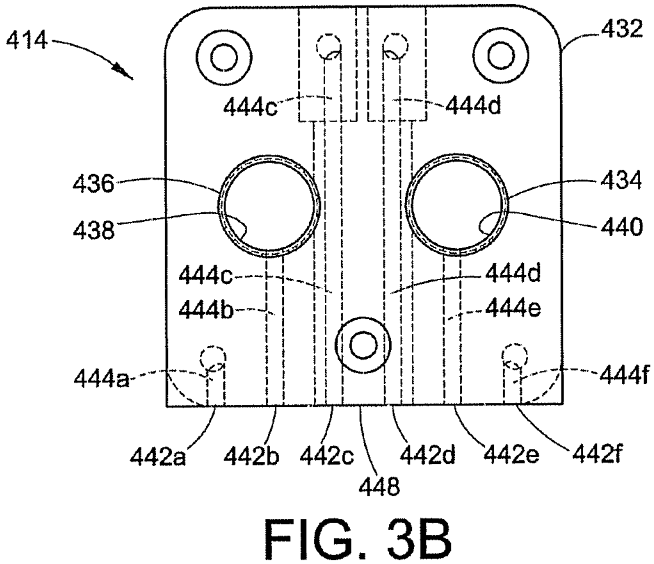

With reference to FIGS. 2A, 2B and 2C there is illustrated an exemplary embodiment of a dense phase pump 402 in accordance with the present invention. Although the pump 402 can be used as a transfer pump as well, it is particularly designed as a gun pump for supplying material to the spray applicators 20. The gun pumps 402 and transfer pumps 400 and 410 share many common design features which will be readily apparent from the detailed descriptions herein.

The pump 402 is preferably although need not be modular in design. The modular construction of the pump 402 is realized with a pump manifold body 414 and a valve body 416. The manifold body 414 houses a pair of pump chambers along with a number of air passages as will be further explained herein. The valve body 416 houses a plurality of valve elements as will also be explained herein. The valves respond to air pressure signals that are communicated into the valve body 416 from the manifold body 414. Although the exemplary embodiments herein illustrate the use of pneumatic pinch valves, those skilled in the are will readily appreciate that various aspects and advantages of the present invention can be realized with the use of other control valve designs other than pneumatic pinch valves.

The upper portion 402*a* of the pump is adapted for purge air arrangements 418*a* and 418*b*, and the lower portion 402*b* of the pump is adapted for a powder inlet hose connector 420 and a powder outlet hose connector 422. A powder feed hose 24 (FIG. 1) is connected to the inlet connector 420 to supply a flow of powder from a supply such as the feed hopper 22. A powder supply hose 406 (FIG. 1) is used to connect the outlet 422 to a spray applicator whether it be a manual or automatic spray gun positioned up at the spray booth 12. The powder supplied to the pump 402 may, but not necessarily must, be fluidized.

Powder flow into an out of the pump 402 thus occurs on a single end 402*b* of the pump. This allows a purge function 418 to be provided at the opposite end 402*a* of the pump thus providing an easier purging operation as will be further explained herein.

If there were only one pump chamber (which is a useable embodiment of the invention) then the valve body 416 could be directly connected to the manifold because there would only be the need for two powder paths through the pump. However, in order to produce a steady, consistent and adjustable flow of powder from the pump, two or more pump chambers are provided. When two pump chambers are used, they are preferably operated out of phase so that as one chamber is receiving powder from the inlet the other is supplying powder to the outlet. In this way, powder flows substantially continuously from the pump. With a single chamber this would not be the case because there is a gap in the powder flow from each individual pump chamber due to the need to first fill the pump chamber with powder. When more than two chambers are used, their timing can be adjusted as needed. In any case it is preferred though not required that all pump chambers communicate with a single inlet and a single outlet.

In accordance with one aspect of the present invention, material flow into and out of each of the pump chambers is accomplished at a single end of the chamber. This provides an arrangement by which a straight through purge function can be used at an opposite end of the pump chamber. Since each pump chamber communicates with the same pump inlet and outlet in the exemplary embodiment, additional modular units are used to provide branched powder flow paths in the form of Y blocks.

A first Y-block 424 is interconnected between the manifold body 414 and the valve body 416. A second Y-block 426 forms the inlet/outlet end of the pump and is connected to the side of the valve body 416 that is opposite the first Y-block 424. A first set of bolts 428 are used to join the manifold body 414, first Y-block 424 and the valve body 416 together. A second set of bolts 430 are used to join the second Y-block 426 to the valve body 416. Thus the pump in FIG. 2A when fully assembled is very compact and sturdy, yet the lower Y-block 426 can easily and separately be removed for replacement of flow path wear parts without complete disassembly of the pump. The first Y-block 424 provides a two branch powder flow path away from each powder chamber. One branch from each chamber communicates with the pump inlet 420 through the valve body 416 and the other branch from each chamber communicates with the pump outlet 422 through the valve body 416. The second Y-block 426 is used to combine the common powder flow paths from the valve body 416 to the inlet 420 and outlet 422 of the pump. In this manner, each pump chamber communicates with the pump inlet through a control valve and with the pump outlet through another control valve. Thus, in the exemplary embodiment, there are four control valves in the valve body that control flow of powder into and out of the pump chambers.

The manifold body 414 is shown in detail in FIGS. 2B, 2E, 2G, 3A and 3B. The manifold 414 includes a body 432 having first and second bores therethrough 434, 436 respectively. Each of the bores receives a generally cylindrical gas permeable filter member 438 and 440 respectively. The gas permeable filter members 438, 440 include lower reduced outside diameter ends 438*a* and 440*a* which insert into a counterbore inside the first Y-block 424 (FIG. 4B) which helps to maintain the members 438, 440 aligned and stable. The upper ends of the filter members abut the bottom ends of purge air fittings 504 with appropriate seals as required. The filter members 438, 440 each define an interior volume (438*c*, 440*c*) that serves as a powder pump chamber so that there are two pump powder chambers provided in this embodiment. A portion of the bores 434, 436 are adapted to receive the purge air arrangements 418*a* and 418*b* as will be described hereinafter.

The filter members 438, 440 may be identical and allow a gas, such as ordinary air, to pass through the cylindrical wall of the member but not powder. The filter members 438, 440 may be made of porous polyethylene, for example. This material is commonly used for fluidizing plates in powder feed hoppers. An exemplary material has about a 40 micron opening size and about a 40-50% porosity. Such material is commercially available from Genpore or Poron. Other porous materials may be used as needed. The filter members 438, 440 each have a diameter that is less than the diameter of its associated bore 434, 436 so that a small annular space is provided between the wall of the bore and the wall of the filter member (see FIGS. 2E, 2G). This annular space serves as a pneumatic pressure chamber. When a pressure chamber has negative pressure applied to it, powder is drawn up into the powder pump chamber and when positive pressure is applied to the pressure chamber the powder in the powder pump chamber is forced out.

The manifold body 432 includes a series of six inlet orifices 442. These orifices 442 are used to input pneumatic energy or signals into the pump. Four of the orifices 442*a, c, d* and *f* are in fluid communication via respective air passages 444*a, c, d* and *f* with a respective pressure chamber 446 in the valve block 416 and thus are used to provide valve actuation air as will be explained hereinafter. Note that the air passages 444 extend horizontally from the manifold surface 448 into the manifold body and then extend vertically downward to the bottom surface of the manifold body where they communicate with respective vertical air passages through the upper Y-block 424 and the valve body 416 wherein they join to respective horizontal air passages in the valve body 416 to open into each respective valve pressure chamber. Air filters (not shown) may be included in these air passages to prevent powder from flowing up into the pump manifold 414 and the supply manifold 404 in the event that a valve element or other seal should become compromised. The remaining two orifices, 442*b* and 442*e* are respectively in fluid communication with the bores 434, 436 via air passages 444*b* and 444*e*. These orifices 442*b* and 442*e* are thus used to provide positive and negative pressure to the pump pressure chambers in the manifold body.

The orifices 442 are preferably, although need not be, formed in a single planar surface 448 of the manifold body. The air supply manifold 404 includes a corresponding set of orifices that align with the pump orifices 442 and are in fluid communication therewith when the supply manifold 404 is mounted on the pump manifold 414. In this manner the supply manifold 404 can supply all required pump air for the valves and pump chambers through a simple planar interface. A seal gasket 450 is compressed between the faces of the pump manifold 414 and the supply manifold 404 to provide fluid tight seals between the orifices. Because of the volume, pressure and velocity desired for purge air, preferably separate purge air connections are used between the supply manifold and the pump manifold. Although the planar interface between the two manifolds is preferred it is not required, and individual connections for each pneumatic input to the pump from the supply manifold 404 could be used as required. The planar interface allows for the supply manifold 404, which in some embodiments includes electrical solenoids, to be placed inside a cabinet with the pump on the outside of the cabinet (mounted to the supply manifold through an opening in a cabinet wall) so as to help isolate electrical energy from the overall system 10. It is noted in passing that the pump 402 need not be mounted in any particular orientation during use.

Figure 4A:
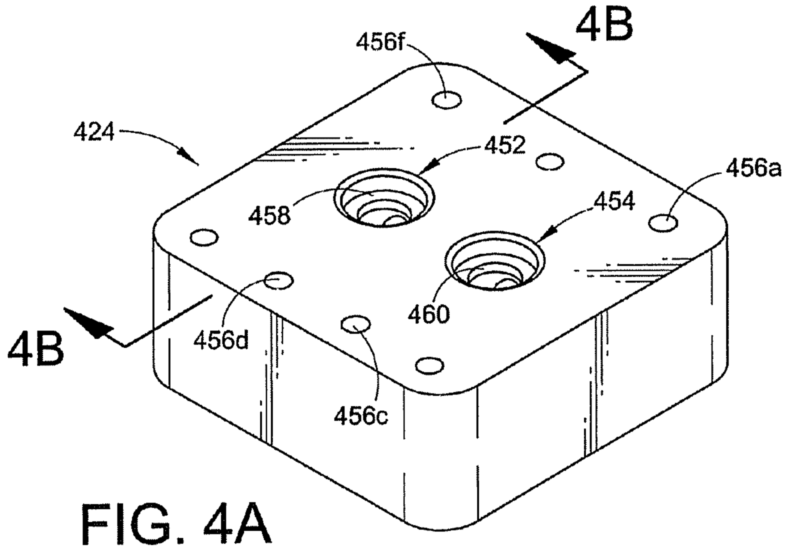
FIGS. 4A and 4B illustrate a first Y-block.
Figure 4B:
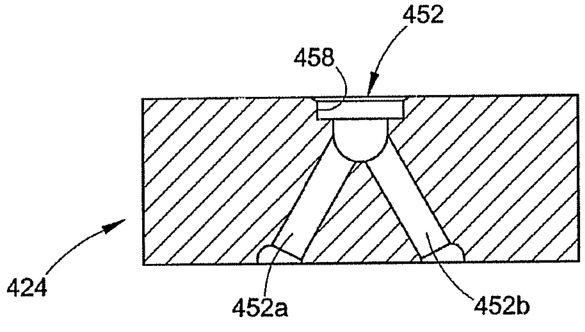

With reference to FIGS. 4A and 4B, the first Y-block 424 includes first and second ports 452, 454 that align with their respective pump chamber 434, 436. Each of the ports 452, 454 communicates with two branches 452*a*, 452*b* and 454*a*, 454*b* respectively (FIG. 4B only shows the branches for the port 452). Thus, the port 452 communicates with branches 452*a* and 452*b*. Therefore, there are a total of four branches in the first Y-block 424 wherein two of the branches communicate with one pressure chamber and the other two communicate with the other pressure chamber. The branches 452*a, b* and 454*a, b* form part of the powder path through the pump for the two pump chambers. Flow of powder through each of the four branches is controlled by a separate pinch valve in the valve body 416 as will be described herein. Note that the Y-block 424 also includes four through air passages 456*a, c, d, f* which are in fluid communication with the air passages 444*a, c, d* and *f* respectively in the manifold body 414. A gasket 459 may be used to provide fluid tight connection between the manifold body 414 and the first Y-block 424.

The ports 452 and 454 include counterbores 458, 460 which receive seals 462, 464 (FIG. 2C) such as conventional o-rings. These seals provide a fluid tight seal between the lower ends of the filter members 438, 440 and the Y-block ports 452, 454. They also allow for slight tolerance variations so that the filter members are tightly held in place.

Figure 5A:
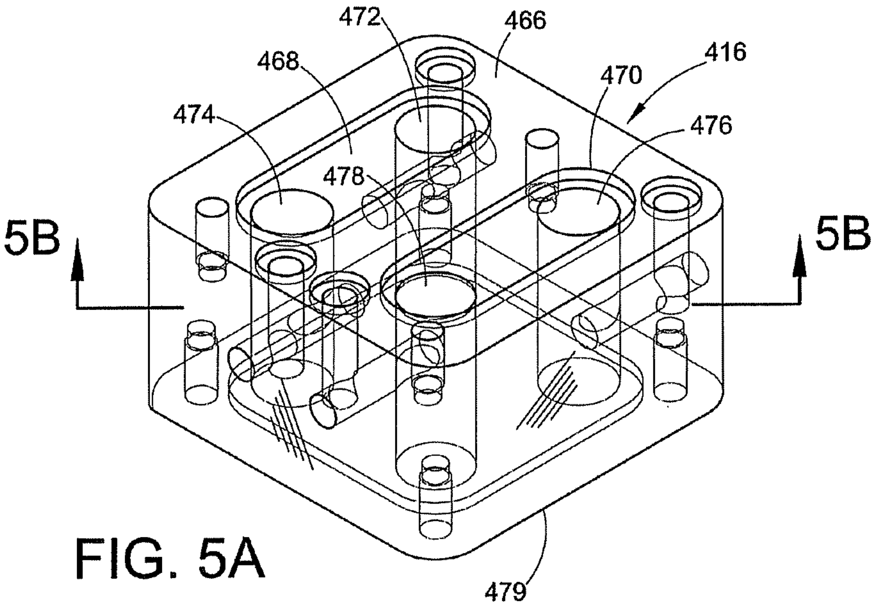
FIGS. 5A and 5B are perspective and cross-sectional views of a valve body.
Figure 5B:
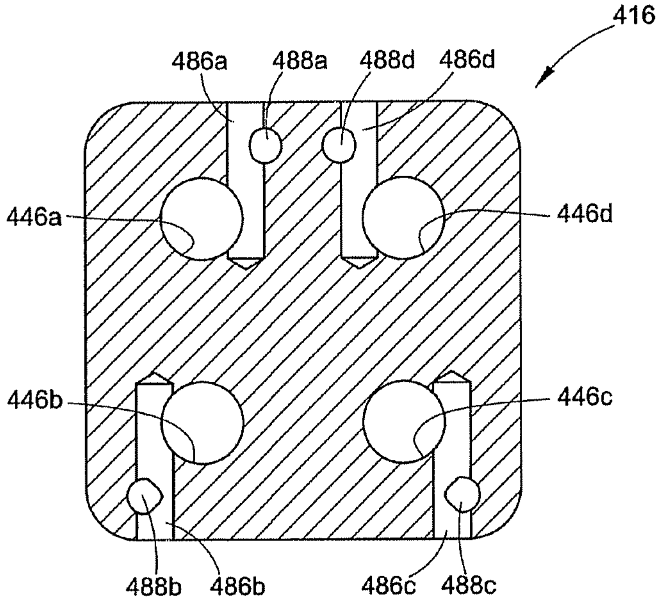

With additional reference to FIGS. 5A and 5B, the valve body 416 includes four through bores 446*a*, 446*b*, 446*c* and 446*d* that function as pressure chambers for a corresponding number of pinch valves. The upper surface 466 of the valve body includes two recessed regions 468 and 470 each of which includes two ports, each port being formed by one end of a respective bore 446. In this embodiment, the first recessed portion 468 includes orifices 472 and 474 which are formed by their respective bores 446*b* and 446*a* respectively. Likewise, the second recessed portion 470 includes orifices 476 and 478 which are formed by their respective bores 446*d* and 446*c* respectively. Corresponding orifices are formed on the opposite side face 479 of the valve body 416.

Each of the pressure chambers 446*a-d* retains either an inlet pinch valve element 480 or an outlet pinch valve 481. Each pinch valve element 480, 481 is a fairly soft flexible member made of a suitable material, such as for example, natural rubber, latex or silicone. Each valve element 480, 481 includes a central generally cylindrical body 482 and two flanged ends 484 of a wider diameter than the central body 482. The flanged ends function as seals and are compressed about the bores 446*a-d* when the valve body 416 is sandwiched between the first Y-block 424 and the second Y-block 426. In this manner, each pinch valve defines a flow path for powder through the valve body 416 to a respective one of the branches 452, 454 in the first Y-block 424. Therefore, one pair of pinch valves (a suction valve and a delivery valve) communicates with one of the pump chambers 440 in the manifold body while the other pair of pinch valves communicates with the other pump chamber 438. There are two pinch valves per chamber because one pinch valve controls the flow of powder into the pump chamber (suction) and the other pinch valve controls the flow of powder out of the pump chamber (delivery). The outer diameter of each pinch valve central body portion 482 is less than the bore diameter of its respect pressure chamber 446. This leaves an annular space surrounding each pinch valve that functions as the pressure chamber for that valve.

The valve body 416 includes air passages 486*a-d* that communicate respectively with the four pressure chamber bores 446*a-d*. as illustrated in FIG. 5B. These air passages 486*a-d* include vertical extensions (as viewed in FIG. 5B) 488*a-d*. These four air passage extensions 488*a, b, c, d* respectively are in fluid communication with the vertical portions of the four air passages 444*d, f, a, c* in the manifold 414 and the vertical passages 456*d, f, a, c* in the upper Y-block 424. Seals 490 are provided for air tight connections.

In this manner, each of the pressure chambers 446 in the valve body 416 is in fluid communication with a respective one of the air orifices 442 in the manifold body 414, all through internal passages through the manifold body, the first Y-block and the valve body. When positive air pressure is received from the supply manifold 404 (FIG. 1) into the pump manifold 414, the corresponding valve 480, 481 is closed by the force of the air pressure acting against the outer flexible surface of the flexible valve body. The valves open due to their own resilience and elasticity when external air pressure in the pressure chamber is removed. This true pneumatic actuation avoids any mechanical actuation or other control member being used to open and close the pinch valves which is a significant improvement over the conventional designs. Each of the four pinch valves 480, 481 is preferably separately controlled for the gun pump 402.

In accordance with another aspect of the invention, the valve body 416 is preferably made of a sufficiently transparent material so that an operator can visually observe the opening and closing of the pinch valves therein. A suitable material is acrylic but other transparent materials may be used. The ability to view the pinch valves also gives a good visual indication of a pinch valve failure since powder will be visible.

Figure 6A:
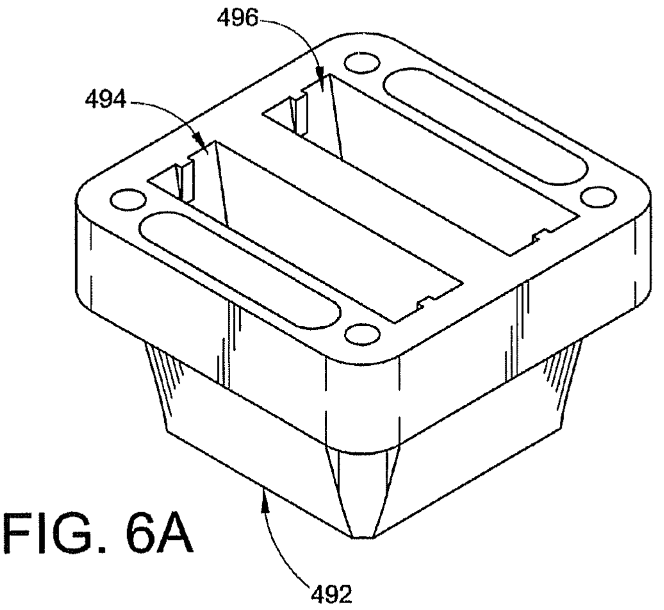
FIGS. 6A and 6B illustrate in perspective another Y-block arrangement.
Figure 6B:
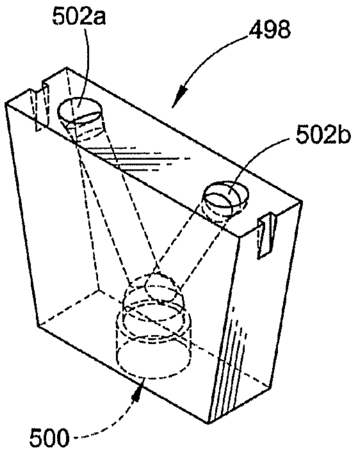

With additional reference to FIGS. 6A and 6B, the remaining part of the pump is the inlet end 402*b* formed by a second Y-block end body 492. The end body 492 includes first and second recesses 494, 496 each of which is adapted to receive a Y-block 498*a* and 498*b*. One of the Y-blocks is used for powder inlet and the other is used for powder outlet. Each Y-block 498 is a wear component due to exposure of its internal surfaces to powder flow. Since the body 492 is simply bolted to the valve body 416, it is a simple matter to replace the wear parts by removing the body 492, thus avoiding having to disassemble the rest of the pump.

Each Y-block 498 includes a lower port 500 that is adapted to receive a fitting or other suitable hose connector 420, 422 (FIG. 2A) with one fitting connected to a hose 24 that runs to a powder supply and another hose 406 to a spray applicator such as a spray gun 20 (FIG. 1). Each Y-block includes two powder path branches 502*a*, 502*b*, 502*c* and 502*d* that extend away from the port 500. Each powder path in the second Y-blocks 498 are in fluid communication with a respective one of the pinch valves 480, 481 in the pinch valve body 416. Thus, powder that enters the pump at the inlet 420 branches through a first of the two lower Y-blocks 498 into two of the pinch valves and from there to the pump chambers. Likewise powder from the two pump chambers recombine from the other two pinch valves into a single outlet 422 by way of the other lower Y-block 498.

The powder flow paths are as follows. Powder enters through a common inlet 420 and branches via paths 502*a* or 502*b* in the lower Y-block 498*b* to the two inlet or suction pinch valves 480. Each of the inlet pinch valves 480 is connected to a respective one of the powder pump chambers 434, 436 via a respective one branch 452, 454 of a respective path through the first or upper Y-block 424. Each of the other branches 452, 454 of the upper Y-block 424 receive powder from a respective pump chamber, with the powder flowing through the first Y-block 424 to the two outlet or delivery pinch valves 481. Each of the outlet pinch valves 481 is also connected to a respect one of the branches 502 in the lower Y-block 498*a* wherein the powder from both pump chambers is recombined to the single outlet 422.

The pneumatic flow paths are as follows. When any of the pinch valves is to be closed, the supply manifold 404 issues a pressure increase at the respective orifice 442 in the manifold body 414. The increased air pressure flows through the respective air passage 442, 444 in the manifold body 414, down through the respective air passage 456 in the first Y-block 424 and into the respective air passage 486 in the valve body 416 to the appropriate pressure chamber 446.

It should be noted that a pump in accordance with the present invention provides for a proportional flow valve based on percent fill of the powder pump chambers, meaning that the flow rate of powder from the pump can be accurately controlled by controlling the open time of the pinch valves that feed powder to the pump chambers. This allows the pump cycle (i.e. the time duration for filling and emptying the pump chambers) to be short enough so that a smooth flow of powder is achieved independent of the flow rate, with the flow rate being separately controlled by operation of the pinch valves. Thus, flow rate can be adjusted entirely by control of the pinch valves without having to make any physical changes to the pump.

The purge function is greatly simplified in accordance with another aspect of the invention. Because the invention provides a way for powder to enter and exit the pump chambers from a single end, the opposite end of the pump chamber can be used for purge air. With reference to FIGS. 2A, 2C, 2E and 2G, a purge air fitting 504 is inserted into the upper end of its respective pump chamber 438, 440. The fittings 504 receive respective check valves 506 that are arranged to only permit flow into the pump chambers 438, 440. The check valves 506 receive respective purge air hose fittings 508 to which a purge air hose can be connected. Purge air is supplied to the pump from the supply manifold 404 as will be described hereinbelow. The purge air thus can flow straight through the powder pump chambers and through the rest of the powder path inside the pump to very effectively purge the pump for a color change operation. No special connections or changes need to be made by the operator to effect this purging operation, thereby reducing cleaning time. Once the system 10 is installed, the purging function is always connected and available, thereby significantly reducing color change time because the purging function can be executed by the control system 39 without the operator having to make or break any powder or pneumatic connections with the pump.

Note from FIGS. 1 and 2A that with all four pinch valves 480, 481 in an open condition purge air will flow straight through the pump chambers, through the powder paths in the first Y-block 424, the pinch valves themselves 480, 481, the second Y-block 498 and out both the inlet 420 and the outlet 422. Purge air thus can be supplied throughout the pump and then on to the spray applicator to purge that device as well as to purge the feed hoses back to the powder supply 22. Thus in accordance with the invention, a dense phase pump concept is provided that allows forward and reverse purging.

Figure 7:
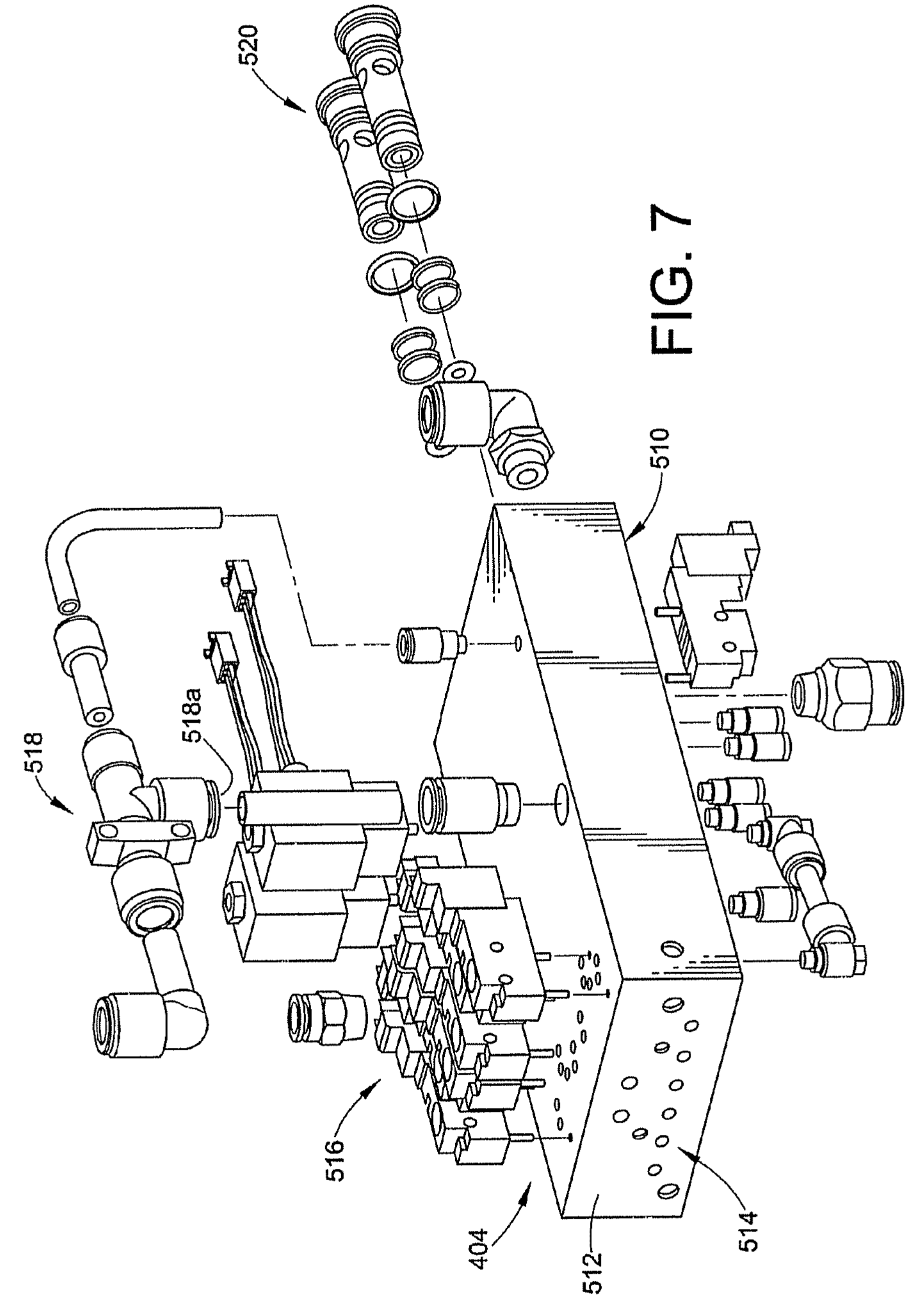
FIG. 7 is an exploded perspective of a supply manifold.

With reference to FIG. 7, the supply manifold 404 illustrated is in essence a series of solenoid valves and air sources that control the flow of air to the pump 402. The particular arrangement illustrated in FIG. 7 is exemplary and not intended to be limiting. The supply of air to operate the pump 402 can be done without a manifold arrangement and in a wide variety of ways. The embodiment of FIG. 7 is provided as it is particularly useful for the planar interface arrangement with the pump, however, other manifold designs can also be used.

The supply manifold 404 includes a supply manifold body 510 that has a first planar face 512 that is mounted against the surface 448 of the pump manifold body 414 (FIG. 3A) as previously described herein. Thus the face 512 includes six orifices 514 that align with their respective orifices 442 in the pump manifold 414. The supply manifold body 510 is machined to have the appropriate number and location of air passages therein so that the proper air signals are delivered to the orifices 514 at the correct times. As such, the manifold further includes a series of valves that are used to control the flow of air to the orifices 514 as well as to control the purge air flow. Negative pressure is generated in the manifold 404 by use of a conventional venturi pump 518. System or shop air is provided to the manifold 404 via appropriate fittings 520. The details of the physical manifold arrangement are not necessary to understand and practice the present invention since the manifold simply operates to provide air passages for air sources to operate the pump and can be implemented in a wide variety of ways. Rather, the details of note are described in the context of a schematic diagram of the pneumatic flow. It is noted at this time, however, that in accordance with another aspect of the invention, a separate control valve is provided for each of the pinch valves in the valve body 414 for purposes that will be described hereinafter.

Figure 8:
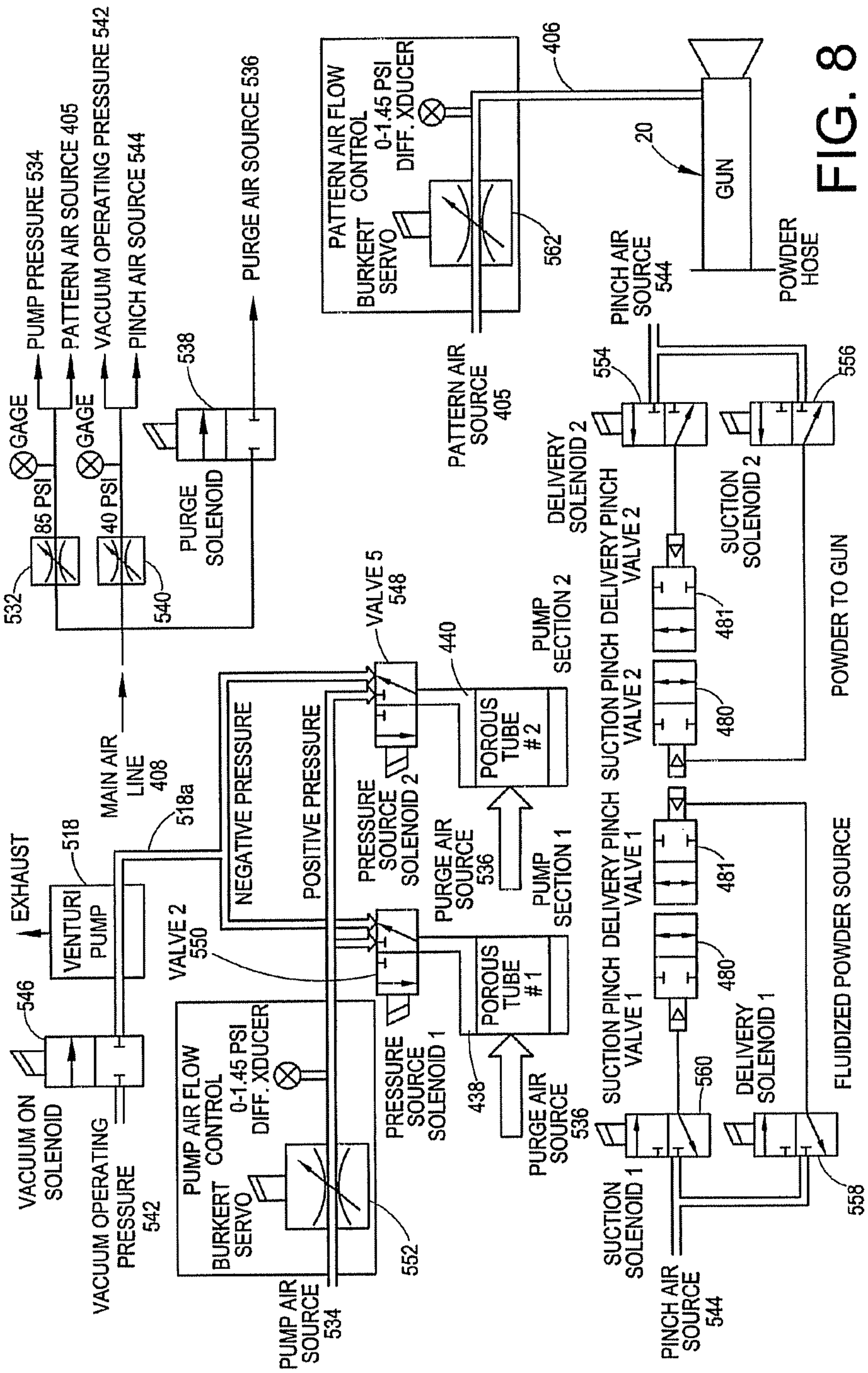
FIG. 8 is an exemplary embodiment of a pneumatic flow arrangement for the pump of FIG. 2A.

With reference to FIG. 8, a pneumatic diagram is provided for a first embodiment of the invention. Main air 408 enters the supply manifold 404 and goes to a first regulator 532 to provide pump pressure source 534 to the pump chambers 438, 440, as well as pattern shaping air source 405 to the spray applicator 20 via air hose 406. Main air also is used as purge air source 536 under control of a purge air solenoid valve 538. Main air also goes to a second regulator 540 to produce venturi air pressure source 542 used to operate the venturi pump (to produce the negative pressure to the pump chambers 438, 440) and also to produce pinch air source 544 to operate the pinch valves 480, 481.

In accordance with another aspect of the invention, the use of the solenoid control valve 538 or other suitable control device for the purge air provides multiple purge capability. The first aspect is that two or more different purge air pressures and flows can be selected, thus allowing a soft and hard purge function. Other control arrangements besides a solenoid valve can be used to provide two or more purge air flow characteristics. The control system 39 selects soft or hard purge, or a manual input could be used for this selection. For a soft purge function, a lower purge air flow is supplied through the supply manifold 404 into the pump pressure chambers 434, 436 which is the annular space between the porous members 438, 440 and their respective bores 434, 436. The control system 39 further selects one set of pinch valves (suction or delivery) to open while the other set is closed. The purge air bleeds through the porous filters 438, 440 and out the open valves to either purge the system forward to the spray gun 20 or reverse (backward) to the supply 22. The control system 39 then reverses which pinch valves are open and closed. Soft purge may also be done in both directions at the same time by opening all four pinch valves. Similarly, higher purge air pressure and flow may be used for a hard purge function forward, reverse or at the same time. The purge function carried out by bleeding air through the porous members 438, 440 also helps to remove powder that has been trapped by the porous members, thus extending the useful life of the porous members before they need to be replaced.

Hard or system purge can also be effected using the two purge arrangements 418*a* and 418*b*. High pressure flow air can be input through the purge air fittings 508 (the purge air can be provided from the supply manifold 404) and this air flows straight through the powder pump chambers defined in part by the porous members 438, 440 and out the pump. Again, the pinch valves 480, 481 can be selectively operated as desired to purge forward or reverse or at the same time.

It should be noted that the ability to optionally purge in only the forward or reverse direction provides a better purging capability because if purging can only be done in both directions at the same time, the purge air will flow through the path of least resistance whereby some of the powder path regions may not get adequately purged. Fir example, when trying the purge a spray applicator and a supply hopper, if the applicator is completely open to air flow, the purge air will tend to flow out the applicator and might not adequately purge the hopper or supply.

The invention thus provides a pump design by which the entire powder path from the supply to and through the spray guns can be purged separately or at the same time with virtually no operator action required. The optional soft purge may be useful to gently blow out residue powder from the flow path before hitting the powder path with hard purge air, thereby preventing impact fusion or other deleterious effects from a hard purge being performed first.

The positive air pressure 542 for the venturi enters a control solenoid valve 546 and from there goes to the venturi pump 518. The output 518*a* of the venturi pump is a negative pressure or partial vacuum that is connected to an inlet of two pump solenoid valves 548, 550. The pump valves 548 and 550 are used to control whether positive or negative pressure is applied to the pump chambers 438, 440. Additional inputs of the valves 548, 550 receive positive pressure air from a first servo valve 552 that receives pump pressure air 534. The outlets of the pump valves 548, 550 are connected to a respective one of the pump chambers through the air passage scheme described hereinabove. Note that the purge air 536 is schematically indicated as passing through the porous tubes 438, 440.

Thus, the pump valves 550 and 552 are used to control operation of the pump 402 by alternately applying positive and negative pressure to the pump chambers, typically 180° out of phase so that as one chamber is being pressurized the other is under negative pressure and vice-versa. In this manner, one chamber is filling with powder while the other chamber is emptying. It should be noted that the pump chambers may or may not completely "fill" with powder. As will be explained herein, very low powder flow rates can be accurately controlled using the present invention by use of the independent control valves for the pinch valves. That is, the pinch valves can be independently controlled apart from the cycle rate of the pump chambers to feed more or less powder into the chambers during each pumping cycle.

Pinch valve air 544 is input to four pinch valve control solenoids 554, 556, 558 and 560. Four valves are used so that there is preferably independent timing control of the operation of each of the four pinch valves 480, 481. In FIG. 8, "delivery pinch valve" refers to those two pinch valves 481 through which powder exits the pump chambers and "suction pinch valve" refers to those two pinch valves 480 through which powder is fed to the pump chambers. Though the same reference numeral is used, each suction pinch valve and each delivery pinch valve is separately controlled.

A first delivery solenoid valve 554 controls air pressure to a first delivery pinch valve 481; a second delivery solenoid valve 558 controls air pressure to a second delivery pinch valve 481; a first suction solenoid valve 556 controls air pressure to a first suction pinch valve 480 and a second suction solenoid valve 560 controls air pressure to a second suction pinch valve 480.

The pneumatic diagram of FIG. 8 thus illustrates the functional air flow that the manifold 404 produces in response to various control signals from the control system 39 (FIG. 1).

Figure 9A:
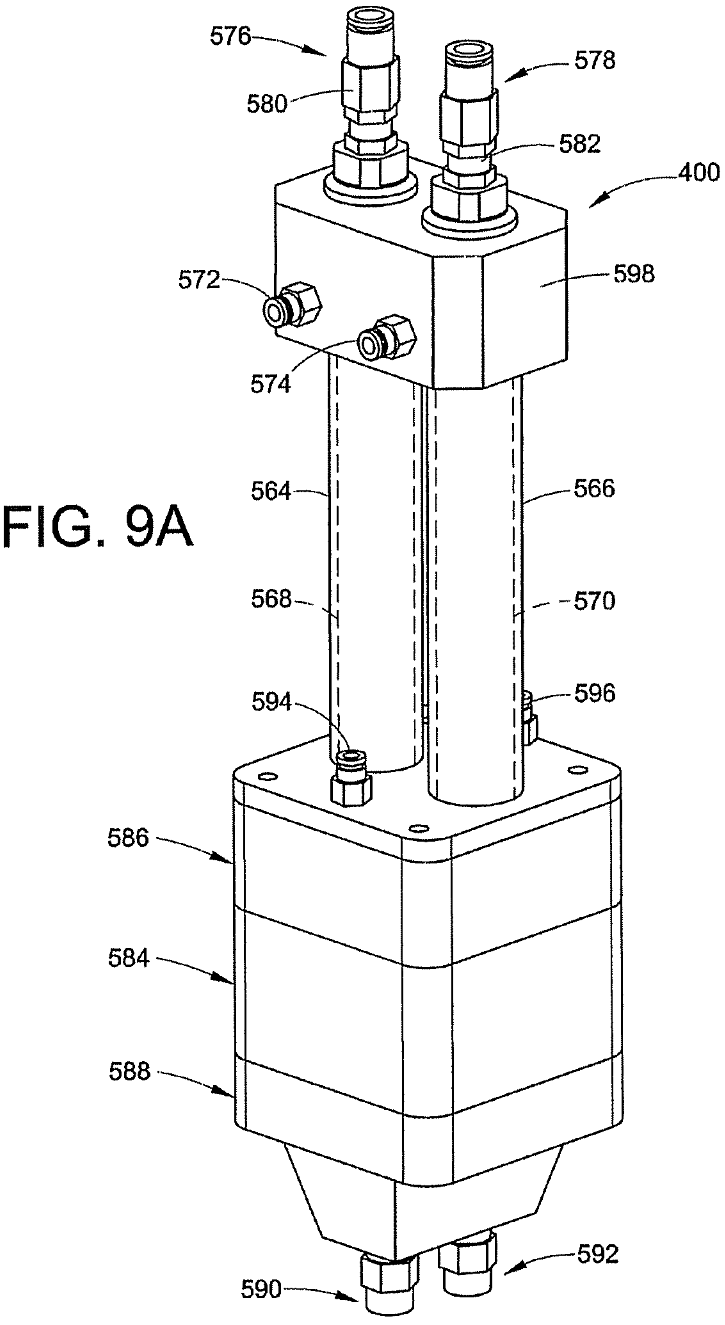
FIGS. 9A and 9B are an isometric and exploded isometric of a transfer pump in accordance with the invention.
Figure 9B:
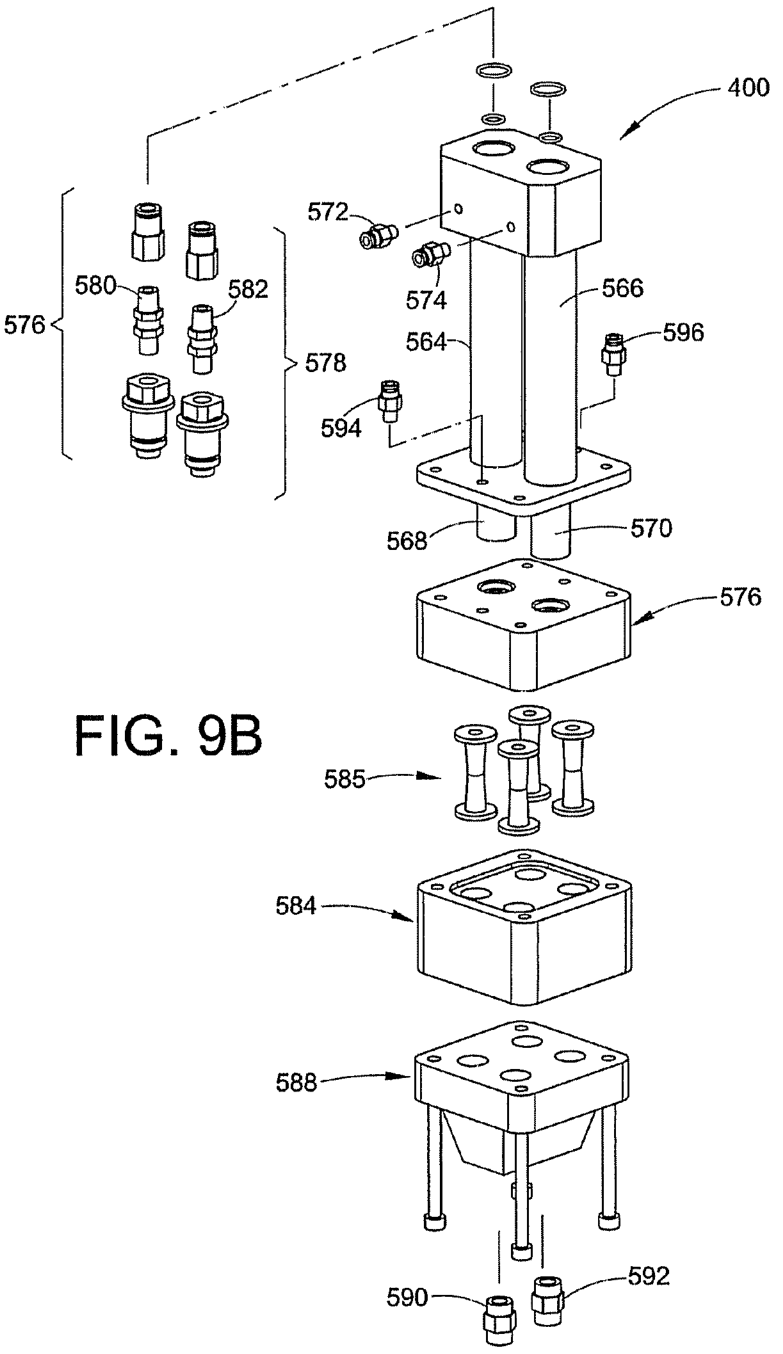

With reference to FIGS. 9A and 9B, and in accordance with another aspect of the invention, a transfer pump 400 is also contemplated. Many aspects of the transfer pump are the same or similar to the spray applicator pump 402 and therefore need not be repeated in detail.

Although a gun pump 402 may be used as a transfer pump as well, a transfer pump is primarily used for moving larger amounts of powder between receptacles as quickly as needed. Moreover, although a transfer pump as described herein will not have the same four way independent pinch valve operation, a transfer valve may be operated with the same control process as the gun pump. For example, some applications require large amounts of material to be applied over large surfaces yet maintaining control of the finish. A transfer pump could be used as a pump for the applicators by also incorporating the four independent pinch valve control process described herein.

In the system of FIG. 1 a transfer pump 400 is used to move powder from the recovery system 28 (such as a cyclone) back to the feed center 22. A transfer pump 410 is also used to transfer virgin powder from a supply, such as a box, to the feed center 22. In such examples as well as others, the flow characteristics are not as important in a transfer pump because the powder flow is not being sent to a spray applicator. In accordance then with an aspect of the invention, the gun pump is modified to accommodate the performance expectations for a transfer pump.

In the transfer pump 400, to increase the powder flow rate larger pump chambers are needed. In the embodiment of FIGS. 9A and 9B, the pump manifold is now replaced with two extended tubular housings 564 and 566 which enclose lengthened porous tubes 568 and 570. The longer tubes 568, 570 can accommodate a greater amount of powder during each pump cycle. The porous tubes 568, 570 have a slightly smaller diameter than the housings 564, 566 so that an annular space is provided therebetween that serves as a pressure chamber for both positive and negative pressure. Air hose fittings 572 and 574 are provided to connect air hoses that are also connected to a source of positive and negative pressure at a transfer pump air supply system to be described hereinafter. Since a pump manifold is not being used, the pneumatic energy is individually plumbed into the pump 400.

The air hose fittings 572 and 574 are in fluid communication with the pressure chambers within the respective housings 564 and 566. In this manner, powder is drawn into and pushed out of the powder chambers 568, 570 by negative and positive pressure as in the gun pump design. Also similarly, purge port arrangements 576 and 578 are provided and function the same way as in the gun pump design, including check valves 580, 582.

A valve body 584 is provided that houses four pinch valves 585 which control the flow of powder into and out of the pump chambers 568 and 570 as in the gun pump design. As in the gun pump, the pinch valves are disposed in respective pressure chambers in the valve body 584 such that positive air pressure is used to close a valve and the valves open under their own resilience when the positive pressure is removed. A different pinch valve actuation scheme however is used as will be described shortly. An upper Y-block 586 and a lower Y-block 588 are also provided to provide branched powder flow paths as in the gun pump design. The lower Y-block 588 thus is also in communication with a powder inlet fitting 590 and a powder outlet fitting 592. Thus, powder in from the single inlet flows to both pump chambers 568, 570 through respective pinch valves and the upper Y-block 586, and powder out of the pump chambers 568, 570 flows through respective pinch valves to the single outlet 592. The branched powder flow paths are realized in a manner similar to the gun pump embodiment and need not be repeated herein. The transfer pump may also incorporate replaceable wear parts or inserts in the lower Y-block 588 as in the gun pump.

Again, since a pump manifold is not being used in the transfer pump, separate air inlets 594 and 596 are provided for operation of the pinch valves which are disposed in pressure chambers as in the gun pump design. Only two air inlets are needed even though there are four pinch valves for reasons set forth below. An end cap 598 may be used to hold the housings in alignment and provide a structure for the air fittings and purge fittings.

Because quantity of flow is of greater interest in the transfer pump than quality of the powder flow, individual control of all four pinch valves is not needed although it could alternatively be done. As such, pairs of the pinch valves can be actuated at the same time, coincident with the pump cycle rate. In other words, when the one pump chamber is filling with powder, the other is discharging powder, and respective pairs of the pinch valves are thus open and closed. The pinch valves can be actuated synchronously with actuation of positive and negative pressure to the pump chambers. Moreover, single air inlets to the pinch valve pressure chambers can be used by internally connecting respective pairs of the pressure chambers for the pinch valve pairs that operate together. Thus, two pinch valves are used as delivery valves for powder leaving the pump, and two pinch valves are used as suction valves for powder being drawing into the pump. However, because the pump chambers alternate delivery and suction, during each half cycle there is one suction pinch valve open and one delivery pinch valve open, each connected to different ones of the pump chambers. Therefore, internally the valve body 584 the pressure chamber of one of the suction pinch valves and the pressure chamber for one of the delivery pinch valves are connected together, and the pressure chambers of the other two pinch valves are also connected together. This is done for pinch valve pairs in which each pinch valve is connected to a different pump chamber. The interconnection can be accomplished by simply providing cross-passages within the valve body between the pair of pressure chambers.

Figure 10:
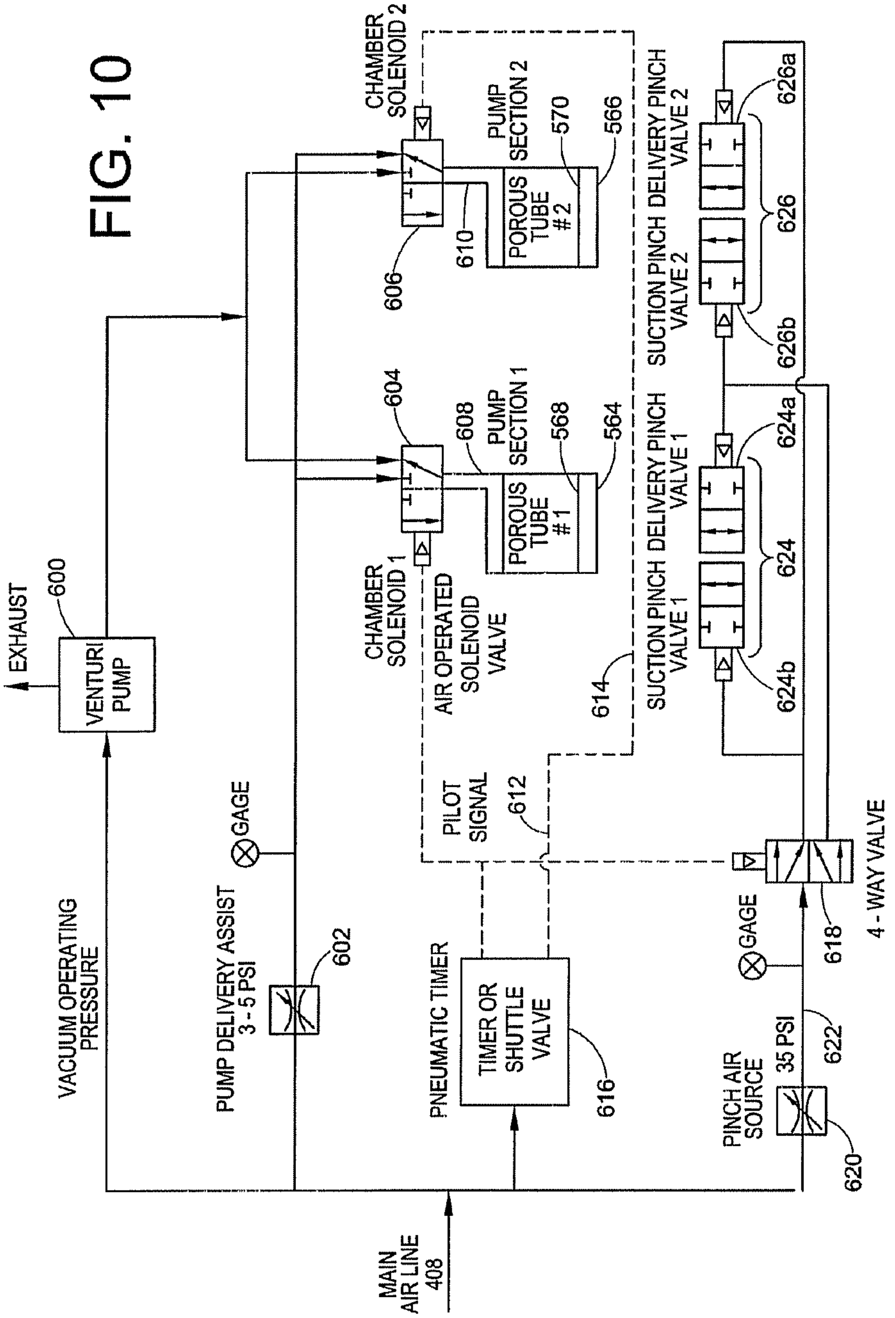
FIG. 10 is an exemplary embodiment of a pneumatic flow arrangement for a transfer pump.

With reference to FIG. 10, the pneumatic diagram for the transfer pump 400 is somewhat more simplified than for a pump that is used with a spray applicator. Main air 408 is input to a venturi pump 600 that is used to produce negative pressure for the transfer pump chambers. Main air also is input to a regulator 602 with delivery air being supplied to respective inputs to first and second chamber solenoid valves 604, 606. The chamber valves also receive as an input the negative pressure from the venturi pump 600. The solenoid valves 604, 606 have respective outputs 608, 610 that are in fluid communication with the respective pressure chambers of the transfer pump.

The solenoid valves in this embodiment are air actuated rather than electrically actuated. Thus, air signals 612 and 614 from a pneumatic timer or shuttle valve 616 are used to alternate the valves 604, 606 between positive and negative pressure outputs to the pressure chambers of the pump. An example of a suitable pneumatic timer or shuttle valve is model S9 568/68-1/4-SO available from Hoerbiger-Origa. As in the gun pump, the pump chambers alternate such that as one is filling the other is discharging. The shuttle timer signal 612 is also used to actuate a 4-way valve 618. Main air is reduced to a lower pressure by a regulator 620 to produce pinch air 622 for the transfer pump pinch valves. The pinch air 622 is delivered to the 4-way valve 618. The pinch air is coupled to the pinch valves 624 for the one pump chamber and 626 for the other pump chamber such that associated pairs are open and closed together during the same cycle times as the pump chambers. For example, when the delivery pinch valve 624*a* is open to the one pump chamber, the delivery pinch valve 626*a* for the other pump chamber is closed, while the suction pinch valve 624*b* is closed and the suction pinch valve 626*b* is open. The valves reverse during the second half of each pump cycle so that the pump chambers alternate as with the gun pump. Since the pinch valves operate on the same timing cycle as the pump chambers, a continuous flow of powder is achieved.

Figure 11:
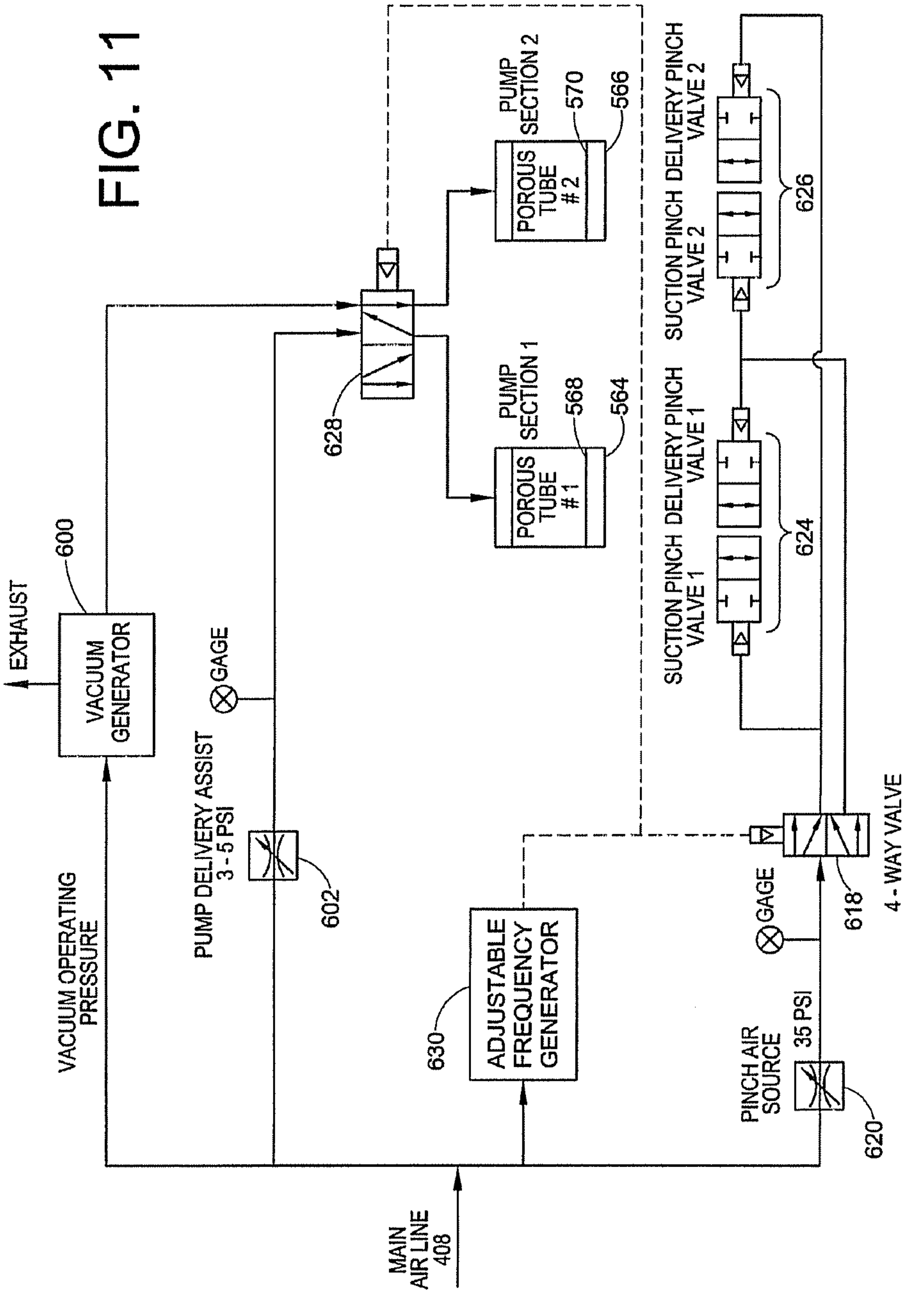
FIG. 11 is an alternative embodiment of a pneumatic circuit for the transfer pump.

FIG. 11 illustrates an alternative embodiment of the transfer pump pneumatic circuit. In this embodiment, the basic operation of the pump is the same, however, now a single valve 628 is used to alternate positive and negative pressure to the pump chambers. In this case, a pneumatic frequency generator 630 is used. A suitable device is model 81 506 490 available from Crouzet. The generator 630 produces a varying air signal that actuates the chamber 4-way valve 628 and the pinch air 4-way valve 618. As such, the alternating cycles of the pump chambers and the associated pinch valves is accomplished.

Figure 12:
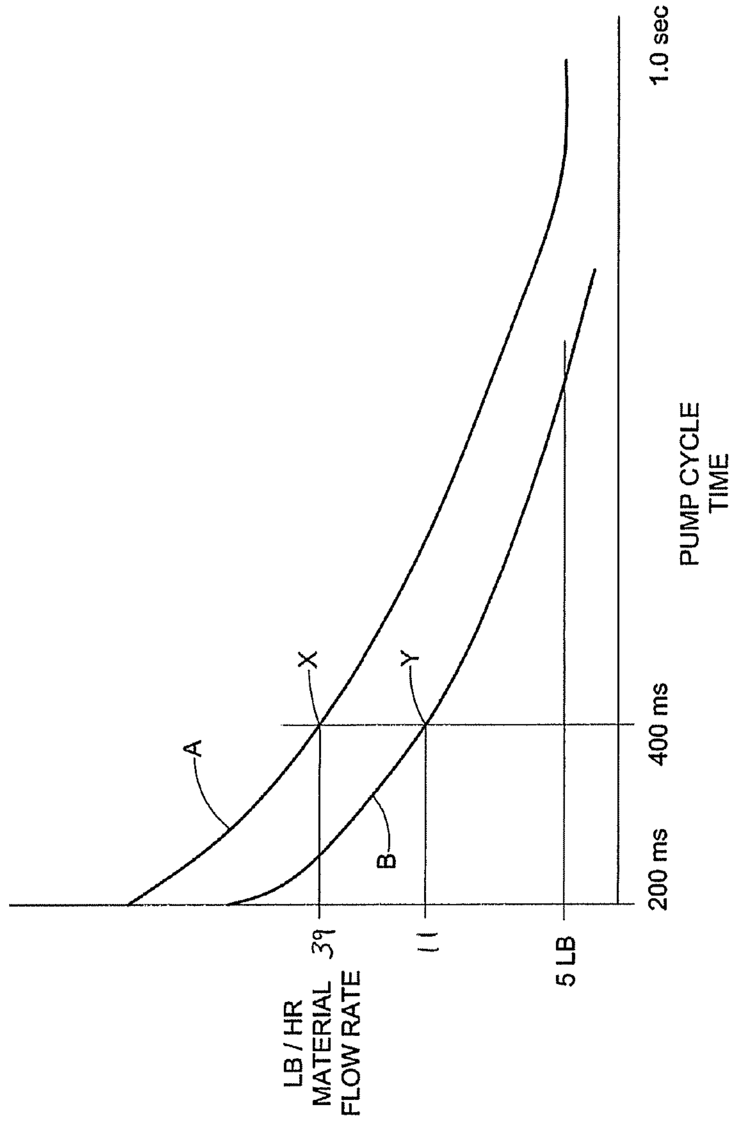
FIG. 12 is a representation of material flow rate curves for a pump operating in accordance with the invention.

FIG. 12 illustrates a flow control aspect of the present invention that is made possible by the independent control of the pinch valves 480, 481. This illustration is for explanation purposes and does not represent actual measured data, but a typical pump in accordance with the present invention will show a similar performance. The graph plots total flow rate in pounds per hour out of the pump versus pump cycle time. A typical pump cycle time of 400 milliseconds means that each pump chamber is filling or discharging during a 400 msec time window as a result of the application of negative and positive pressure to the pressure chambers that surround the porous members. Thus, each chamber fills and discharges during a total time of 800 msec. Graph A shows a typical response if the pinch valves are operated at the same time intervals as the pump chamber. This produces the maximum powder flow for a given cycle time. Thus, as the cycle time increases the amount of powder flow decreases because the pump is operating slower. Flow rate thus increases as the cycle time decreases because the actual time it takes to fill the pump chambers is much less than the pump cycle time. Thus there is a direct relationship between how fast or slow the pump is running (pump cycle time based on the time duration for applying negative and positive pressure to the pump pressure chambers) and the powder flow rate.

Graph B is significant because it illustrates that the powder flow rate, especially low flow rates, can be controlled and selected by changing the pinch valve cycle time relative to the pump cycle time. For example, by shortening the time that the suction pinch valves stay open, less powder will enter the pump chamber, no matter how long the pump chamber is in suction mode. In FIG. 12, for example, graph A shows that at pump cycle time of 400 msec, a flow rate of about 39 pounds per hour is achieved, as at point X. If the pinch valves however are closed in less than 400 msec time, the flow rated drops to point Y or about 11 pounds per hour, even though the pump cycle time remains at 400 msec. What this assures is a smooth consistent powder flow even at low flow rates. Smoother powder flow is effected by higher pump cycle rates, but as noted above this would also produce higher powder flow rates. So to achieve low powder flow rates but with smooth powder flow, the present invention allows control of the powder flow rate even for faster pump cycle rates, because of the ability to individually control operation of the suction pinch valves, and optionally the delivery pinch valves as well. An operator can easily change flow rate by simply entering in a desired rate. The control system 39 is programmed so that the desired flow rate is effected by an appropriate adjustment of the pinch valve open times. It is contemplated that the flow rate control is accurate enough that in effect this is an open loop flow rate control scheme, as opposed to a closed loop system that uses a sensor to measure actual flow rates. Empirical data can be collected for given overall system designs to measure flow rates at different pump cycle and pinch valve cycle times. This empirical data is then stored as recipes for material flow rates, meaning that if a particular flow rate is requested the control system will know what pinch valve cycle times will achieve that rate. Control of the flow rate, especially at low flow rates, is more accurate and produces a better, more uniform flow by adjusting the pinch valve open or suction times rather than slowing down the pump cycle times as would have to be done with prior systems. Thus the invention provides a scalable pump by which the flow rate of material from the pump can be, if desired, controlled without changing the pump cycle rate.

Figure 13:
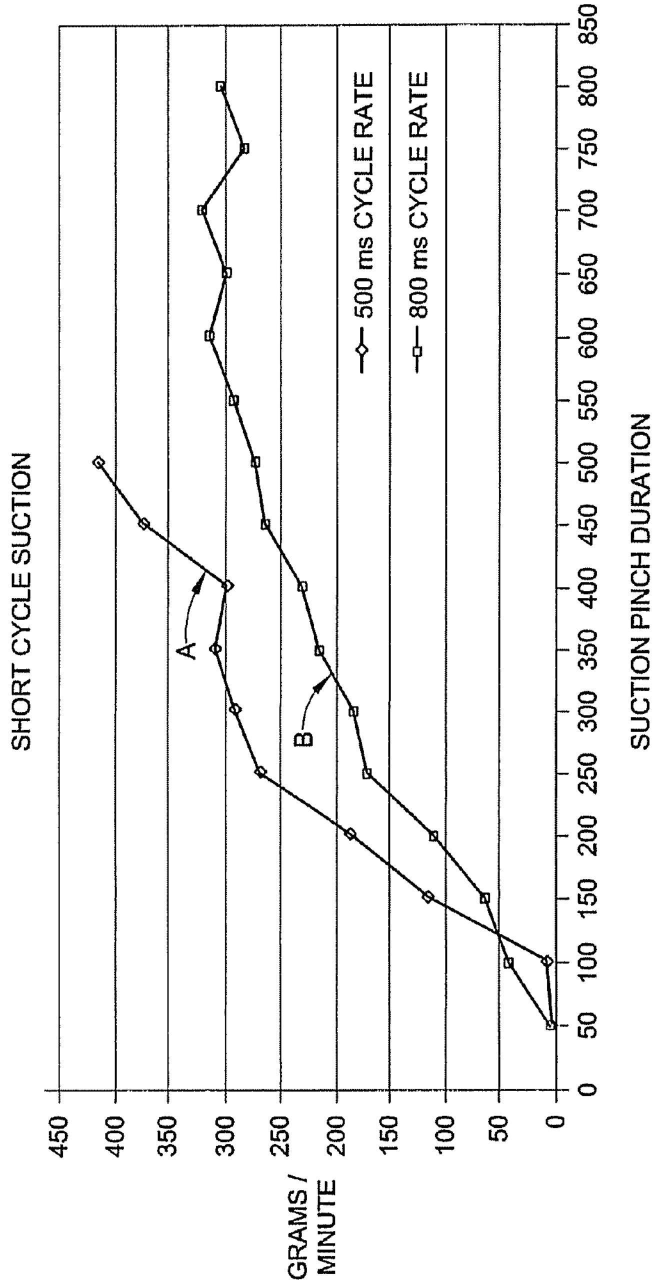
FIG. 13 is a graph depicting powder flow rates versus pinch valve open duration for two different pump cycle rates.

FIG. 13 further illustrates the pump control concept of the present invention. Graph A shows flow rate versus pinch valve open duration at a pump cycle rate of 500 msec, and Graph B shows the data for a pump cycle rate of 800 msec. Both graphs are for dual chamber pumps as described herein. First it will be noted that for both graphs, flow rate increases with increasing pinch valve open times. Graph B shows however that the flow rate reaches a maximum above a determinable pinch valve open duration. This is because only so much powder can fill the pump chambers regardless of how long the pinch valves are open. Graph A would show a similar plateau if plotted out for the same pinch valve duration times. Both graphs also illustrate that there is a determinable minimum pinch valve open duration in order to get any powder flow from the pump. This is because the pinch valves must be open long enough for powder to actually be sucked into and pushed out of the pump chambers. Note that in general the faster pump rate of Graph A provides a higher flow rate for a given pinch valve duration.

The data and values and graphs provided herein are intended to be exemplary and non-limiting as they are highly dependent on the actual pump design. The control system 39 is easily programmed to provide variable flow rates by simply having the control system 39 adjust the valve open times for the pinch valves and the suction/pressure times for the pump chambers. These functions are handled by the material flow rate control 672 process.

In an alternative embodiment, the material flow rate from the pump can be controlled by adjusting the time duration that suction is applied to the pump pressure chamber to suck powder into the powder pump chamber. While the overall pump cycle may be kept constant, for example 800 msec, the amount of time that suction is actually applied during the 400 msec fill time can be adjusted so as to control the amount of powder that is drawn into the powder pump chamber. The longer the vacuum is applied, the more powder is pulled into the chamber. This allows control and adjustment of the material flow rate separate from using control of the suction and delivery pinch valves.

Use of the separate pinch valve controls however can augment the material flow rate control of this alternative embodiment. For example, as noted the suction time can be adjusted so as to control the amount of powder sucked into the powder chamber each cycle. By also controlling operation of the pinch valves, the timing of when this suction occurs can also be controlled. Suction will only occur while negative pressure is applied to the pressure chamber, but also only while the suction pinch valve is open. Therefore, at the time that the suction time is finished, the suction pinch valve can be closed and the negative pressure to the pressure chamber can be turned off. This has several benefits. One benefit is that by removing the suction force from the pressure chamber, less pressurized process air consumption is needed for the venturi pump that creates the negative pressure. Another benefit is that the suction period can be completely isolated from the delivery period (the delivery period being that time period during which positive pressure is applied to the pressure chamber) so that there is no overlap between suction and delivery. This prevents backflow from occurring between the transition time from suction to delivery of powder in the powder pump chamber. Thus, by using independent pinch valve control with the use of controlling the suction time, the timing of when suction occurs can be controlled to be, for example, in the middle of the suction portion of the pump cycle to prevent overlap into the delivery cycle when positive pressure is applied. As in the embodiment herein of using the pinch valves to control material flow rate, this alternative embodiment can utilize empirical data or other appropriate analysis to determine the appropriate suction duration times and optional pinch valve operation times to control for the desired flow rates. During the discharge or delivery portion of the pump cycle, the positive pressure can be maintained throughout the delivery time. This has several benefits. By maintaining positive pressure the flow of powder is smoothed out in the hose that connects the pump to a spray gun. Because the suction pinch valves can be kept closed during delivery time, there can be an overlap between the end of a delivery (i.e. positive pressure) period and the start of the subsequent suction period. With the use of two pump chambers, the overlap assures that there is always positive pressure in the delivery hose to the gun, thereby smoothing out flow and minimizing pulsing. This overlap further assures smooth flow of powder while the pinch valves can be timed so that positive pressure does not cause back flow when the suction pinch valves are opened. Again, all of the pinch valve and pressure chamber timing scenarios can be selected and easily programmed into the control system 39 to effect whatever flow characteristic and rates are desired from the pump. Empirical data can be analyzed to optimize the timing sequences for various recipes.

The invention contemplates a dense phase pump that is highly efficient in terms of the use of pressurized process air needed to operate the pump. As noted above, the suction pressure optionally can be turned off as part of the pump flow rate control process because the pinch valves can be separately timed. This reduces the consumption of process air for operating the venturi pump that produces the negative suction pressure. The use of dense phase transport allows for smaller powder flow path geometries and less air needed to transport material from the pump to the gun. Still further, the pinch valves operate in a normally open mode, thus there is no need for air pressure or a control member or device to open the pinch valves or to maintain them open.

Thus, the invention contemplates a scalable material flow rate pump output by which is meant that the operator can select the output flow rate of the pump without having to make any changes to the system other than to input the desired flow rate. This can be done through any convenient interface device such as a keyboard or other suitable mechanism, or the flow rates can be programmed into the control system 39 as part of the recipes for applying material to an object. Such recipes commonly include such things as flow rates, voltages, air flow control, pattern shaping, trigger times and so on.

The invention has been described with reference to the preferred embodiment. Modifications and alterations will occur to others upon a reading and understanding of this specification and drawings. The invention is intended to include all such modifications and alterations insofar as they come within the scope of the appended claims or the equivalents thereof.

What is claimed is:

1. A pump for dry particulate material, comprising:

a pump chamber comprising a gas permeable member disposed in a pressure chamber;

a first pinch valve and a second pinch valve wherein each said pinch valve comprises a member that defines part of a flow path for material into or out of said pump chamber;

a first control valve for controlling application of negative pressure to said pressure chamber and a second control valve for controlling application of positive pressure to said pressure chamber;

wherein during pump operation material flows into said pump chamber under negative pressure applied to said gas permeable member under the control of said first control valve and material flows out of said pump chamber under positive pressure applied to said gas permeable member under the control of said second control valve;

said first pinch valve and said second pinch valve being operable to control flow of material into and out of said pump chamber, a control circuit that controls operation of each of said first pinch valve, said second pinch valve, said first control valve and said second control valve independently of each other.

2. The pump of claim 1, wherein the flow rate of material from the pump is controlled as a function of the duration time of said negative pressure.

3. The pump of claim 2, wherein flow rate of material from the pump is adjustable independent of the pump cycle duration.

4. The pump of claim 3 wherein said control circuit adjusts duration of time that the negative pressure is applied to the pressure chamber to adjust flow rate.

5. The pump of claim 4 wherein said first pinch valve and said second pinch valve have open/closed times that are separately controllable with respect to the negative pressure duration time.

6. The pump of claim 1, wherein said gas permeable member is cylindrical and said pump chamber is located within said gas permeable member.

7. The pump of claim 1, wherein said pump chamber is a first pump chamber, said pressure chamber is a first pressure chamber, and said gas permeable member is a first gas permeable member, further comprising a second pump chamber comprising a second gas permeable member disposed in a second pressure chamber, a third pinch valve and a fourth pinch valve, wherein each said third pinch valve and fourth pinch valve comprises a member that defines part of a flow path for material into or out of said second pump chamber, a third control valve for controlling the application of negative pressure to said second pressure chamber and a fourth control valve for controlling application of positive pressure to said second pressure chamber;

wherein during pump operation material flows into said first pump chamber under negative pressure applied to said first gas permeable member under the control of said first control valve and material flows out of said first pump chamber under positive pressure applied to said first gas permeable member under the control of said second control valve; and wherein during pump operation material flows into said second pump chamber under negative pressure applied to said second gas permeable member under the control of said third control valve and material flows out of said second pump chamber under positive pressure applied to said second gas permeable member under the control of said fourth control valve said third pinch valve and said fourth pinch valve being operable to control flow of material into or out of said second pump chamber, a control circuit that controls operation of each of said first pinch valve, said second pinch valve, said third pinch valve, said fourth pinch valve, said first control valve, said second control valve, said third control valve and said fourth control valve independently of each other.

8. The pump of claim 5, wherein said first gas permeable member is cylindrical and said second gas permeable member is cylindrical and said first pump chamber is located within said first gas permeable member and said second pump chamber is located within said second gas permeable member.

* * * * *